(12) United States Patent
Yamashita et al.

(10) Patent No.: US 7,949,056 B2
(45) Date of Patent: May 24, 2011

(54) BALANCED TRANSMITTING APPARATUS

(75) Inventors: Akihiro Yamashita, Miyaki-gun (JP);
Fumio Ichihara, Chikushi-gun (JP);
Tsunehiro Hanada, Fukuoka (JP);
Mutsuhiko Oishi, Izuka (JP); Toshiyuki Wakisaka, Izuka (JP); Masahiro Maki, Kasuya-gun (JP)

(73) Assignee: Panasonic Corporation, Osaka (JP)

( * ) Notice: Subject to any disclaimer, the term of this patent is extended or adjusted under 35 U.S.C. 154(b) by 1603 days.

(21) Appl. No.: 11/105,568

(22) Filed: Apr. 14, 2005

(65) Prior Publication Data
US 2005/0238107 A1 Oct. 27, 2005

(30) Foreign Application Priority Data
Apr. 16, 2004 (JP) ................. P. 2004-121377

(51) Int. Cl.
*H04B 3/00* (2006.01)
(52) U.S. Cl. ........ 375/258; 375/229; 375/256; 375/257; 340/310.01; 340/310.02; 340/310.03; 340/310.04; 340/310.05; 340/310.06; 340/310.07; 340/310.08
(58) Field of Classification Search .............. 375/219, 375/220, 257, 258, 295, 296, 229, 254; 455/114.3; 340/310.01, 310.02, 310.03, 310.04, 310.05, 340/310.06, 310.07, 310.08
See application file for complete search history.

(56) References Cited

U.S. PATENT DOCUMENTS

| | | | | |
|---|---|---|---|---|
| 6,263,077 B1 * | 7/2001 | Zuranski et al. | ......... | 379/406.08 |
| 6,295,323 B1 * | 9/2001 | Gabara | ......... | 375/257 |
| 6,667,685 B2 * | 12/2003 | Wasaki et al. | ......... | 375/285 |
| 2003/0137405 A1 * | 7/2003 | Kaku et al. | ......... | 340/310.01 |
| 2004/0131123 A1 * | 7/2004 | Maki et al. | ......... | 375/257 |

FOREIGN PATENT DOCUMENTS

| | | |
|---|---|---|
| DE | 3237919 | 4/1984 |
| JP | 63-013428 | 1/1988 |
| JP | 63-136726 | 6/1988 |
| JP | 2-025121 | 1/1990 |
| JP | 2-027848 | 1/1990 |
| JP | 2004080441 | 3/2004 |
| JP | 2004140565 | 5/2004 |
| WO | 9302518 | 4/1993 |
| WO | WO 2004017515 A1 * | 2/2004 |

OTHER PUBLICATIONS

International Search Report dated Aug. 12, 2005.
T. Ideguchi, et al., "Electromagnetic Noise Issue and the Countermeasure of Information Communication System," Morikita-Syuppan, pp. ii-vi, 99-134, Nov. 25, 1997 with partial English translation.
Japanese Office Action dated Mar. 30, 2010 with English translation.

* cited by examiner

*Primary Examiner* — Leon Flores
(74) *Attorney, Agent, or Firm* — Dickinson Wright PLLC

(57) ABSTRACT

A balanced transmission signal Tx (t) (voltage e, −e) is applied to a transmission line (L1, L2), a suppression signal ($e_c$) is generated from a common mode suppression signal source ($e_c$), and the suppression signal ($e_c$) is superposed on respectives of balanced transmission signals via adders (15a, 15b). By pertinently controlling a level of the suppression signal ($e_c$), voltage levels and phases of respectives of the transmission signals transmitted to the transmission lines (L1, L2) are controlled.

27 Claims, 14 Drawing Sheets

BALANCED TRANSMITTING APPARATUS

BACKGROUND OF THE INVENTION

The present invention relates to a balanced transmitting apparatus.

FIG. 18 is a view showing a current model on a transmission line. The transmission line is constituted by transmission lines (L1, L2) comprising a pair of conductors balanced relative to the earth ground.

In FIG. 18, a pair of voltage sources (e10, e20) are provided at left ends of the transmission lines. Characteristics of waveform, amplitude, phase and the like of e10 and e20 are equal and voltages generated from the respective voltage sources (e10, e20) (respective voltages are designated by notation "e") are applied to the respective lines (L1, L2).

A load impedance (regular load) ZL is provided at right ends of the transmission lines. Differential (normal) mode currents (+Id, −Id) directed inverse to each other flow in the transmission lines (L1, L2).

Incidentally, parasitic impedances (impedances to the ground) Z1 through Z3 are interposed between the transmission lines and the ground (earth).

In this case, when impedance values (also the values are designated as Z2, Z3) of the parasitic impedances Z2, Z3 are not equal, a common mode current Ic which is a circulating current by way of the parasitic impedances (impedances to the ground) Z1 through Z3 as well as the ground flows.

In the case of transmission lines having a sufficiently high balance, it can be regarded that Z2=Z3 and the common mode current Ic does not flow. However, in the case of lines having a comparatively low balance, Z2≠Z3, and the common mode current Ic flows.

A current amount of the common mode current Ic can be represented as follows. In Equation (1) shown below, notation e designates respective voltages generated from the respective voltages sources (e10, e20).

$$Ic = \frac{e \cdot (Z2 - Z3)}{Z1 \cdot Z2 + Z2 \cdot Z3 + Z3 \cdot Z1} \quad (1)$$

The common mode current Ic is bifurcatedly branched to flow equally at respectives of the pair of transmission lines (L1, L2). Therefore, a common mode current (the current amount becomes Ic/2) flows in the respective transmission lines (L1, L2) in the same direction.

Further, the common mode current becomes a factor of producing radiation from the line. That is, when signals having the same amplitude and inverse phases are superposed on respectives of the pair of lines, although radiation components radiated from the respective lines are canceled by each other when a balanced state is maintained, in an unbalance state, there is a case in which the radiation components are not canceled by each other completely but the radiation components leak to outside.

FIG. 19 is a view showing a constitution of an example of a balanced transmission circuit of a background art. According to the balanced transmission circuit of FIG. 19, an unbalance transmission signal (transmission signal of one route) is converted into a balanced signal by way of a transformer (800) and balanced transmission is carried out by way of the pair of transmission lines (PL1, PL2).

The common mode current can be suppressed to be low by promoting the degree of balance by using the transformer having a high degree of balance or inserting a common mode choke coil operating to remove the common mode current.

Further, when lines having a high balance (for example, lines exclusive for communication of twist pair cables or the like, for example, Ethernet (registered trade mark)) are used as the transmission lines (PL1, PL2), the common mode current generated on the lines are suppressed to a sufficiently low level and therefore, the problem of radiation is not posed.

Further, with regard to radiation caused by the unbalance component of the transmission lines, a detailed description is given in Nonpatent Reference 1.

[Nonpatent Reference 1] "Electromagnetic noise problem of information communication system and technology dealing therewith" by Ideguchi, K. et al, Morikita shuppan, Nov. 25, 1997, P. 99-134

In the case of lines having a high balance (for example, lines exclusive for communication), the common mode current on the lines are sufficiently suppressed from being generated and therefore, the problem of radiation is not posed. Therefore, it becomes important to reduce the common mode current as less as possible by promoting a degree of balance of the transmission per se as much as possible by devising a constitution of an unbalance-balance converting circuit.

However, when lines having a comparatively low degree of balance are used as communication lines, even when the degree of balance of the transmission signal is promoted, generation of the common mode current cannot necessarily be reduced.

That is, since the communication lines per se are provided with an unbalance characteristic, there is a case in which an effect of sufficiently suppressing the common mode current cannot be achieved by the technology of the background art of "promoting a degree of balance of the transmission signal per se".

SUMMARY OF THE INVENTION

The invention has been carried out in view of the above-described situation of the background art and it is an object thereof to provide a balanced transmitting apparatus capable of suppressing an unbalance state even when an unbalance component is present in transmission lines.

A lanced transmitting apparatus of the invention is a balanced transmitting apparatus for transmitting a data by using transmission lines comprising a pair of conductors, the balanced transmitting apparatus comprising a suppression signal generator inputted with a detecting signal of an unbalance state of the transmission lines for generating a suppression signal for suppressing an unbalance component produced in the transmission lines based on the detecting signal, and an adder for adding the suppression signal to respectives of original balanced signals constituting original balanced transmission signals transmitted to the transmission lines.

By the constitution, the balanced transmitting apparatus capable of suppressing the unbalance state even when the unbalance component is present in the transmission lines Preferably, the detecting signal is to detect at least any one of a common mode current, a common mode voltage, an electric field, a magnetic field produced at the transmission lines and a degree of interference caused by radiation from the transmission lines.

By the constitution, the detecting signal directly or indirectly measures the common mode current, the common mode voltage, the electric field, the magnetic field or the like to detect the unbalance state of the transmission lines. By finding the unbalance state of the communication lines, the suppression signal having the characteristic of suppressing the unbalance can be generated.

DETAILED DESCRIPTION OF THE DRAWINGS

DETAILED DESCRIPTION OF THE PREFERRED EMBODIMENTS

Figure 1:
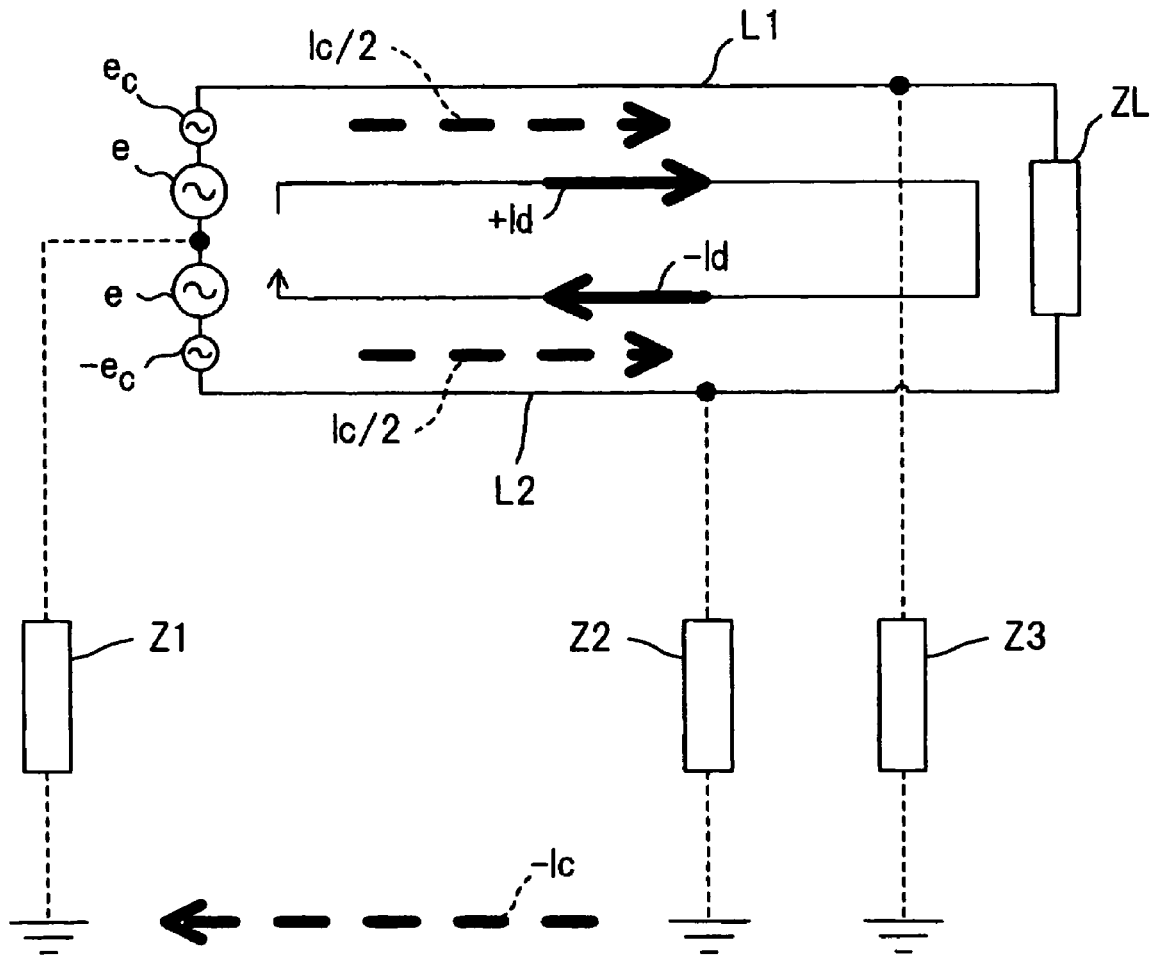
FIG. 1 is a diagram showing a principle constitution for suppressing unbalance of transmission lines as well as a current model on the transmission lines according to an embodiment of the invention.

First, an explanation will be given of a method of suppressing an unbalance component of transmission lines according to embodiments of the invention. FIG. 1 is a view showing a principle constitution for suppressing an unbalance component of transmission lines and a current model on the transmission lines according to embodiments of the invention.

Figure 18:
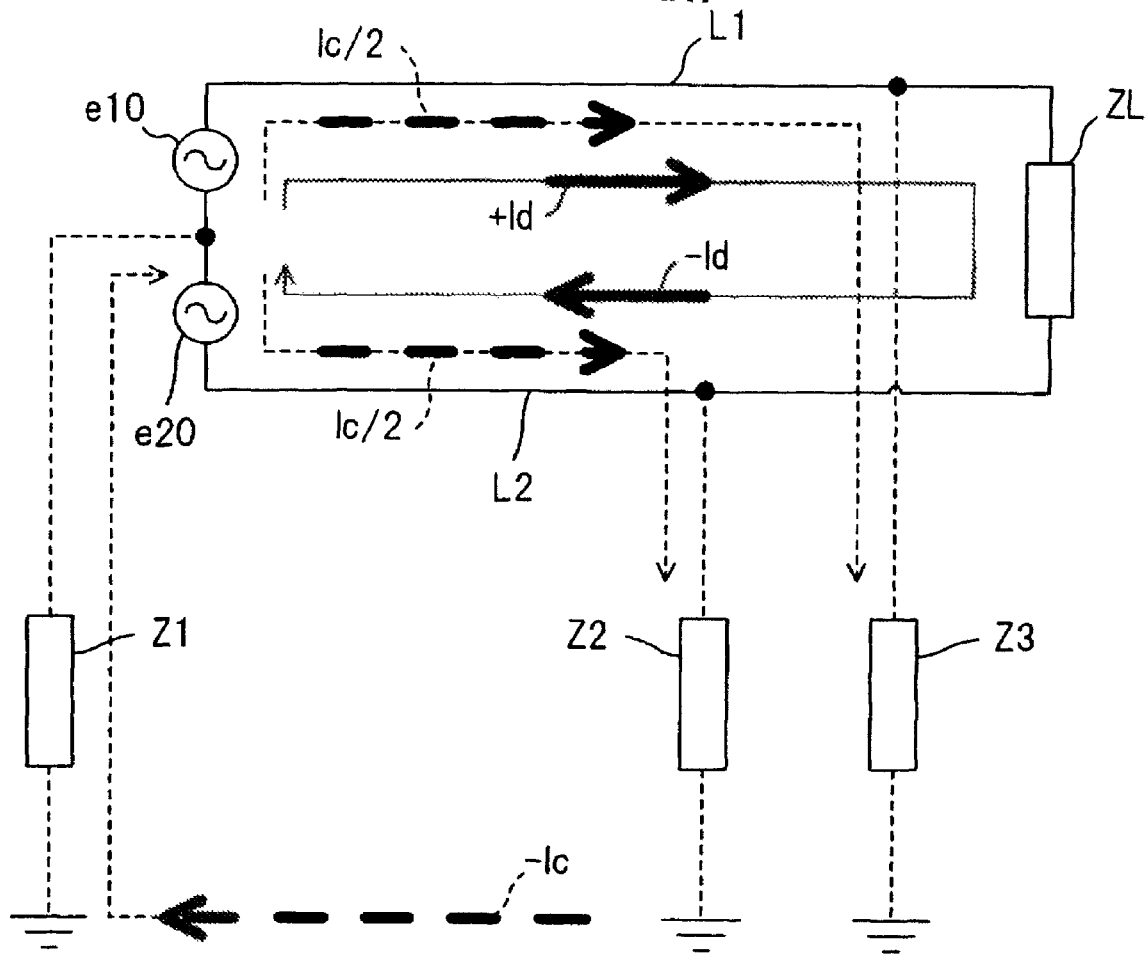
FIG. 18 is a diagram showing a current model on transmission lines.
Figure 19:
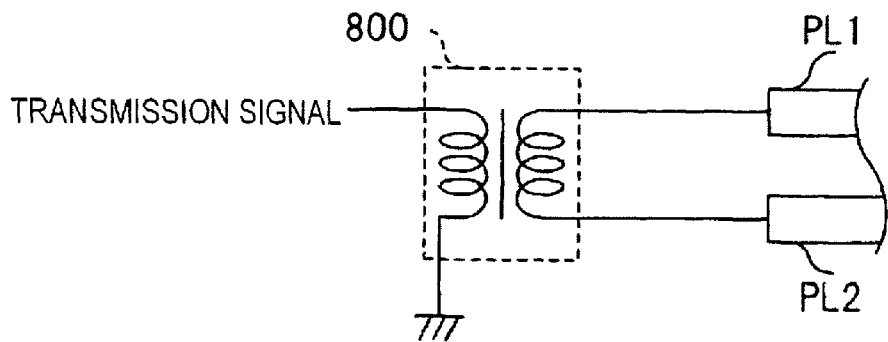
FIG. 19 is a diagram showing a constitution of an example of a balanced transmission circuit of a background art.

According to the current model on the transmission lines of FIG. 1, suppression signal sources ($e_c$, $-e_c$) are added to the constitution of FIG. 18. Thereby, an unbalance component of the communication lines can be suppressed by intentionally constituting a balanced transmission signal to be unbalanced.

As shown by FIG. 1, the transmission lines are constituted by a pair of lines (L1, L2) balanced relative to the ground (earth). Left ends of the transmission lines are provided with the pair of signal sources (e,e) and further provided with the suppression signal sources ($e_c$, $-e_c$).

The right ends of the transmission lines are provided with load impedance (regular load) ZL. A differential (normal) mode currents (+Id, −Id) directed inverse to each other flow in the transmission lines (L1, L2).

Incidentally, the parasitic impedances (impedances to the ground) Z1 through Z3 are present between the transmission lines and the ground (earth). In this case, when impedance values (also the values are designated by notations Z2, Z3) of the parasitic impedances Z2, Z3 are not equal, the common mode current Ic which is the circulating current flow by way of the parasitic impedances (impedances to the ground) Z1 through Z3 as well as the ground (earth).

In the case of transmission lines having a sufficiently high degree of balance, it can be regarded that Z2=Z3, the common mode current Ic does not flow. However, in the case of lines having a comparatively low degree of balance, Z2≠Z3 and the common mode current Ic flows.

A current amount of the common mode current Ic can be represented by Equation (2) shown below.

$$Ic = \frac{(e+e_c) \cdot Z2 - (e-e_c) \cdot Z3}{Z1 \cdot Z2 + Z2 \cdot Z3 + Z3 \cdot Z1} \quad (2)$$

The common mode current Ic is bifurcatedly branched and flows equally in respectives of the pair of transmission lines (L1, L2). Therefore, common mode currents (the current amount becomes Ic/2) flow in the respective transmission lines (L1, L2) in the same direction.

When the common mode current Ic flows, the degree of balance of the transmission lines are reduced and the common mode current constitutes a factor for producing radiation from the lines.

Hence, according to the embodiment of the invention, a value of $e_c$ is determined to satisfy Equation (3) shown below.

Further, notation $e_c$ is shown in Equation (4).

$$(e + e_c) \cdot Z2 - (e - e_c) \cdot Z3 = 0 \quad (3)$$

$$e_c = \frac{e \cdot (Z3 - Z2)}{Z3 + Z2} \quad (4)$$

Equation (3) indicates to nullify a numerator portion of Equation (2), that is, nullify the common mode current Ic. In this way, the common mode current can be nullified as Ic=0. Therefore, the unbalance (unbalance) of the transmission lines can be suppressed.

Further, $(e+e_c)+(e-e_c)=2e$ and therefore, the differential mode output is not influenced by adding the suppression signal sources and remains unchanged.

In this way, the balanced transmitting apparatus of the embodiment of the invention is provided with the constitution of generating the suppression signal and superposing the suppression signal on respectives of the balanced transmission signals. The "suppression signal" refers to a signal for suppressing the unbalance component produced in the transmission lines. The "unbalance component" is indicated by an unbalanced current or unbalanced voltage of the transmission lines. Therefore, the suppression signal is provided with a characteristic of suppressing the unbalanced current or the unbalanced voltage.

Figure 2:
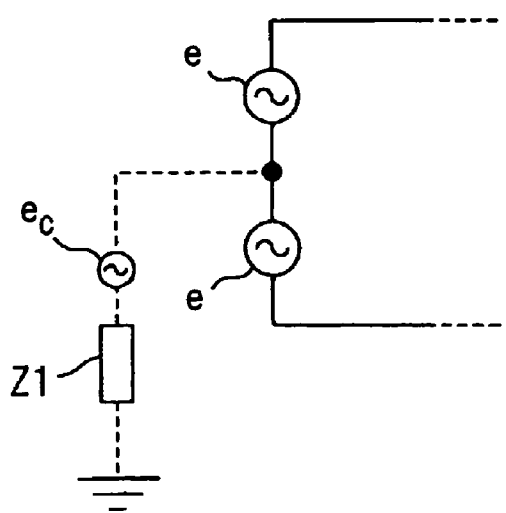
FIG. 2 is a diagram showing an essential portion of a current model equivalent to the current model shown in FIG. 1.

FIG. 2 is a diagram showing an essential portion of a current model equivalent to the current model shown in FIG. 1. In FIG. 2, a common suppression signal source ($e_c$) is inserted between a common connecting point of the two signal sources (e, e) and the parasitic impedance Z1. The constitution of FIG. 1 (constitution provided with suppression signal sources $e_c$, $-e_c$) is equivalent to the constitution of FIG. 2. In FIG. 2, suppression signal source ($e_c$, $-e_c$) has a function of suppression signal generator.

Figure 3:
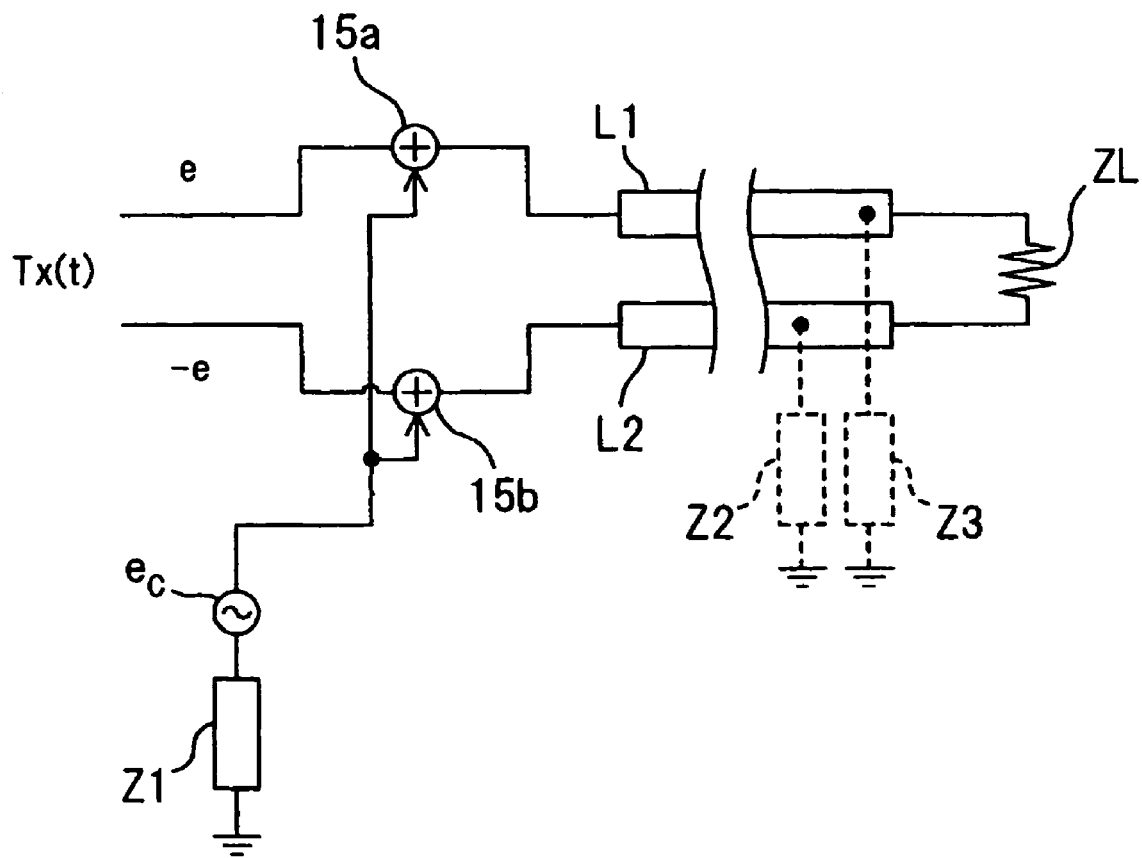
FIG. 3 is a diagram showing a basic constitution of a balanced transmitting apparatus (and communication system) of an embodiment of the invention.

FIG. 3 is a diagram showing a basic constitution of a balanced transmitting apparatus (and communication system) of the embodiment of the invention. As shown by FIG. 3, balanced transmission signals Tx (t) (voltages e, -e) are applied to transmission lines at inside of a balanced transmitting apparatus, on the other hand, a suppression signal ($e_c$) is generated from a common mode suppression signal source e, and the suppression signal ($e_c$) is applied to respectives of the balanced transmission signals by way of adders 15a, 15b.

The balanced transmission signals superposed with the suppression signals are transmitted to an apparatus on a counter side (in FIG. 3, represented as a load impedance ZL) by way of a pair of transmission lines (L1, L2).

According to the balanced transmission apparatus of the invention shown in FIG. 3, by pertinently controlling a level of the suppression signal ($e_c$), unbalance of the communication lines (transmission lines) can effectively be suppressed.

Further, FIG. 3 shows a basic form of the balanced transmitting apparatus of the invention and the invention can be variously modified and applied.

First Embodiment

According to the embodiment, an explanation will mainly be given of an example of a constitution of generating a suppression signal by an analog signal processing and superposing the suppression signal on a transmission signal.

Figure 20:
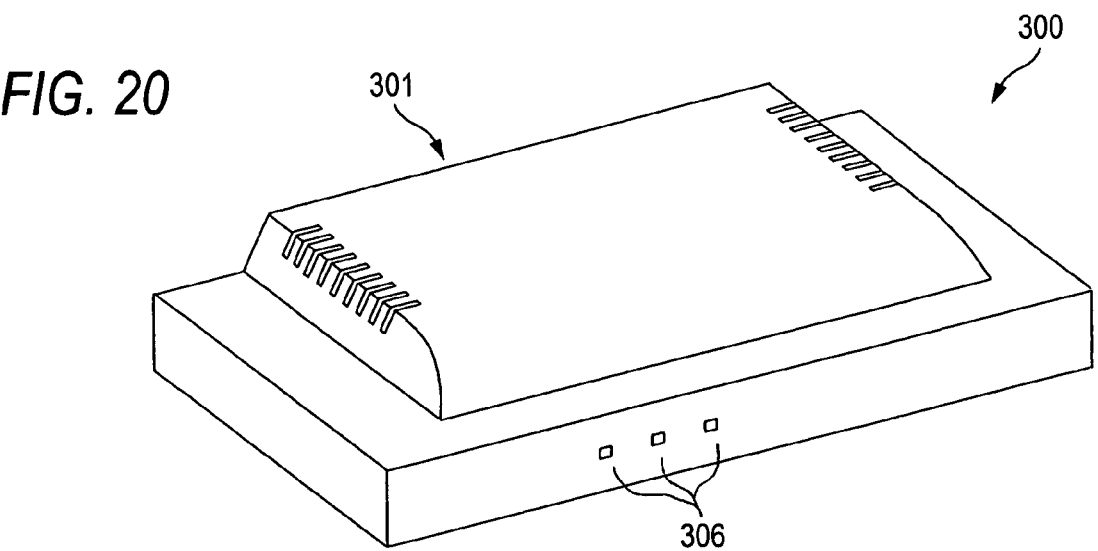
FIG. 20 is an outlook perspective view showing a balanced transmitting apparatus (front face).
Figure 21:
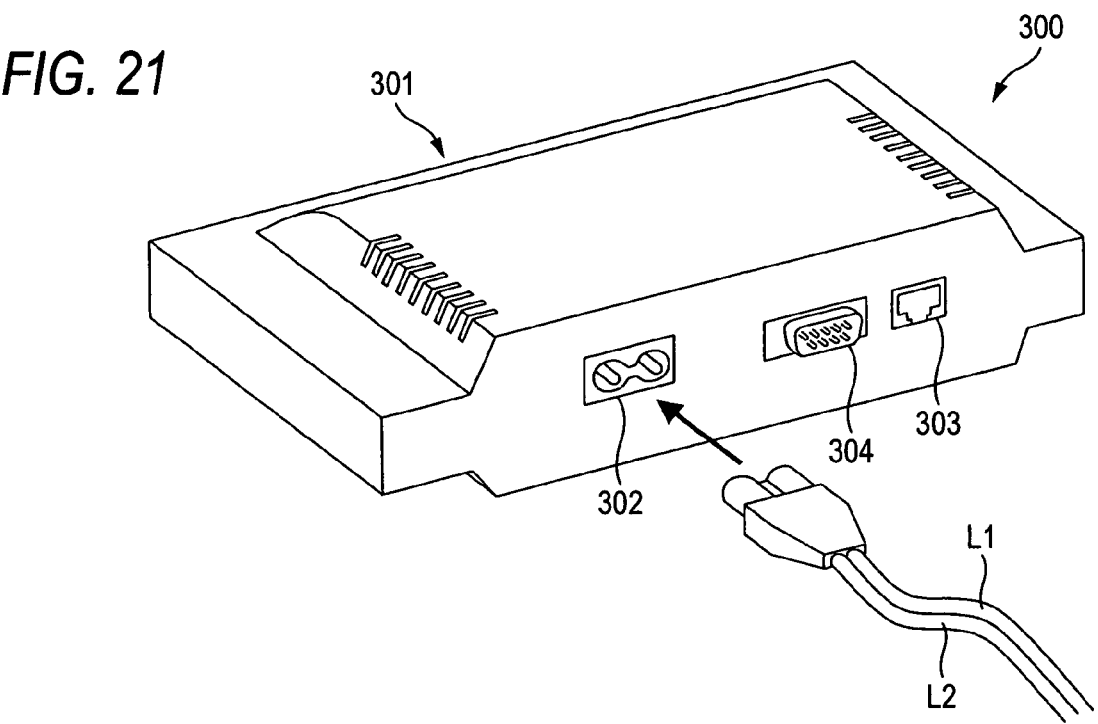
FIG. 21 is an outlook perspective view showing the balanced transmitting apparatus (rear face).

FIG. 20 is an outlook perspective view showing a balanced transmitting apparatus (front face) and FIG. 21 is an outlook perspective view showing the balanced transmitting apparatus (rear face). As shown by FIGS. 20 and 21, a balanced transmitting apparatus 300 according to the embodiment is a modem. The balanced transmitting apparatus 300 is provided with a cabinet 301. As shown by FIG. 20, the front face of the cabinet 301 is provided with a display portion 306 of LED (Light Emitting Diode) or the like. As shown by FIG. 21, the rear face of the cabinet 301 is provided with a power source connector 302, a modular jack 303 for LAN (Local Area Network) of RJ45 or the like and a Dsub connector 304. As shown by FIG. 21, the power source connector 302 is connected with transmission lines (L1, L2) of parallel cables or the like. The Dsub connector 304 is connected with a Dsub cable, not illustrated.

Inside of the cabinet 301 is provided with a transmission data generating portion (mentioned later) and a coupler transformer (mentioned later). The transmission lines (L1, L2) are applied with an alternating current voltage (for example, 100 VAC), and when the transmission data generating portion outputs a balanced transmission signal, the balanced transmission signal is superposed on the alternating current voltage by way of the coupler transformer. Further, although the modem of FIG. 20 and FIG. 21 is shown as the example of the balanced transmitting apparatus, the balanced transmitting apparatus needs not to particularly limit thereto but the balanced transmitting apparatus may be an electric apparatus having a modem (for example, a household apparatus of a television set or the like).

Figure 4:
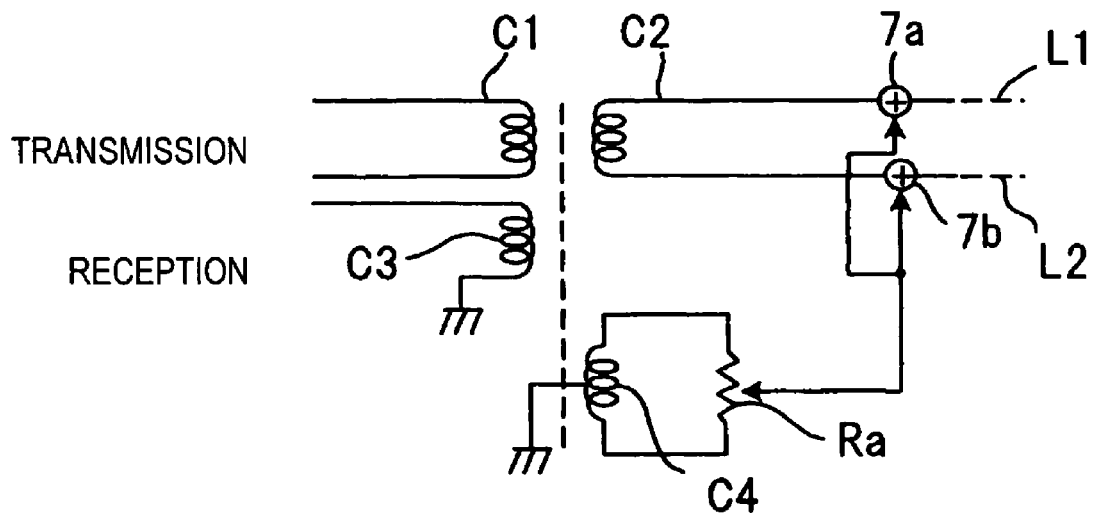
FIG. 4 is a diagram showing other example of a constitution of generating a suppression signal and superposing the suppression signal on a transmission signal.

FIG. 4 is a diagram showing other example of a constitution of generating a retraining signal and superposing the suppression signal on a transmission signal. In FIG. 4, when the transmission signal is transmitted to the transmission line (L1, L2) by way of coupler transformers (transformers C1, C2, C3) which are transformers for communication, an auxiliary winding C4 is provided, and a voltage induced at the auxiliary winding C4 is divided by a dividing resistor Ra to generate the suppression signal. Further, the generated suppression signal is superposed on the transmission signal by way of adders 7a, 7b. In FIG. 4, the auxiliary winding C4 and the dividing resistor have a function of suppression signal generator.

Figure 5:
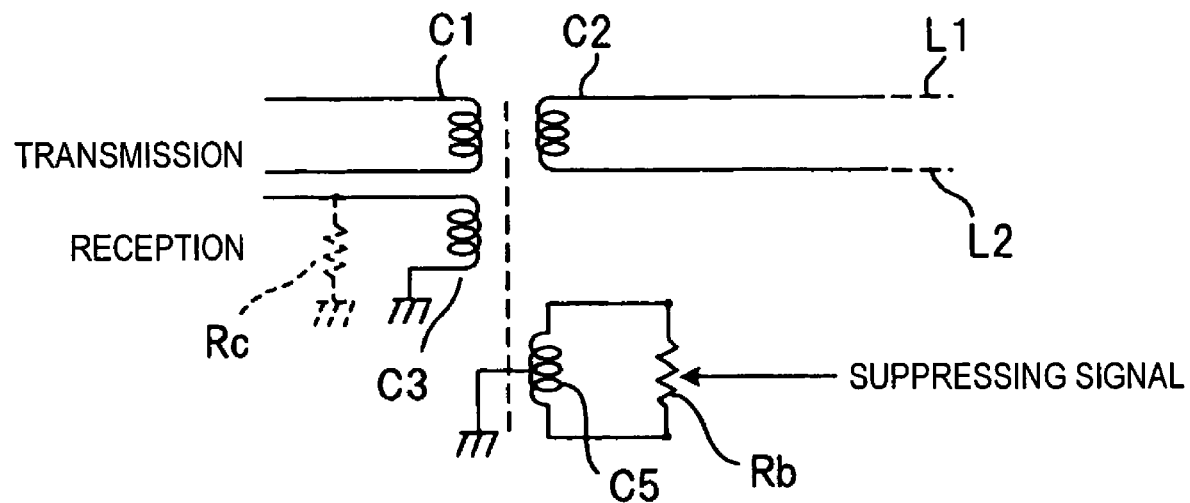
FIG. 5 is a diagram showing other example of a constitution of generating a suppression signal and superposing the suppression signal on a transmission signal.

FIG. 5 is a diagram showing other example of the constitution of generating the suppression signal and superposing the suppression signal on the transmission signal. In FIG. 5, similar to FIG. 4, the coupler transformer is provided with an auxiliary winding C5, a voltage induced at the auxiliary winding C5 is divided by a dividing resistor Rb to generate the suppression signal. At this occasion, the dividing resistor Rb can be utilized also as a receiving load in place of a resistor Rc which is an inherent receiving load. Thereby, the suppression signal can be generated by efficiently utilizing the transformers.

Figure 6:
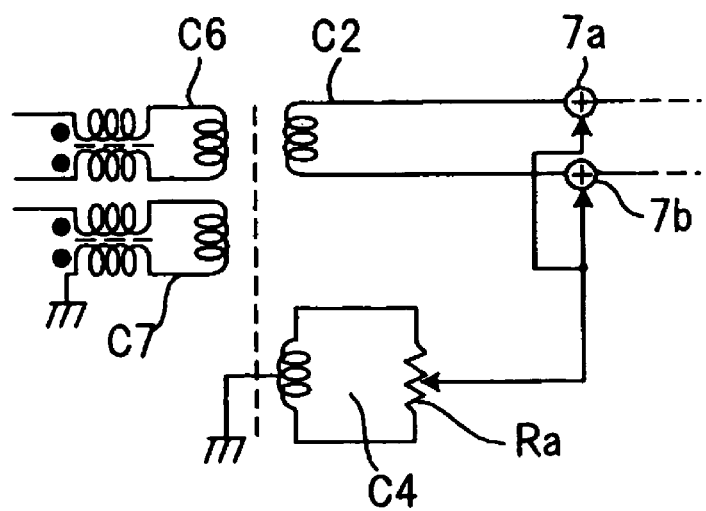
FIG. 6 is a diagram showing other example of a constitution of generating a suppression signal and superposing the suppression signal on a transmission signal.

FIG. 6 is a diagram showing other example of a constitution of generating a suppression signal and superposing a suppression signal on a transmission signal. In FIG. 6, the coupler transformer shown in FIG. 4 is further inserted with a common mode choke coil to promote an effect of suppressing unbalance of the communication lines. In FIG. 6, windings inserted with CMC are attached with reference notations C6, C7.

Figure 7:
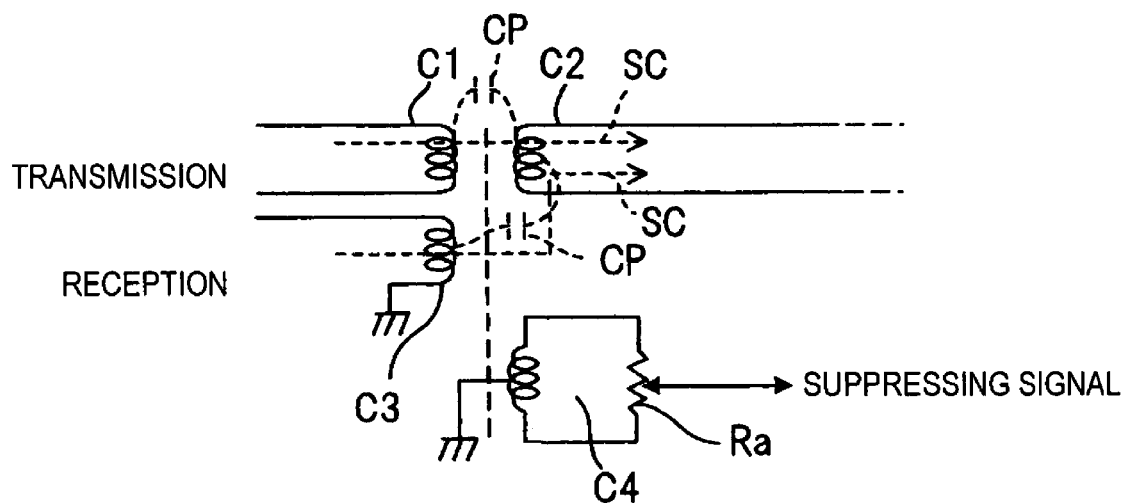
FIG. 7 is a diagram showing an influence of a parasitic capacitance generated at a coupler transformer.

The common mode choke coil is inserted for reducing an influence of a parasitic capacitance between windings of the coupler transformer. FIG. 7 is a diagram showing the influence of the parasitic capacitance generated at the coupler transformer. Inherently, it is preferable in view of control to constitute the common mode signal transmitted in the transmission lines by only a suppressing common mode signal. However, the common mode signal (arrow mark SC of FIG. 7) is transmitted to the side of the lines by way of the parasitic capacitance CP between the windings. Further, an influence is effected on accuracy to control, control range or the like by the common mode signal.

However, according to the constitution of the embodiment, by inserting the common mode choke coil as shown by FIG. 6, the common mode signal transmitted by way of the parasitic capacitance can be suppressed.

Next, an explanation will be given of an example of a constitution for superposing a generated suppression signal on a transmission signal (or transmission line) in analog.

Figure 8:
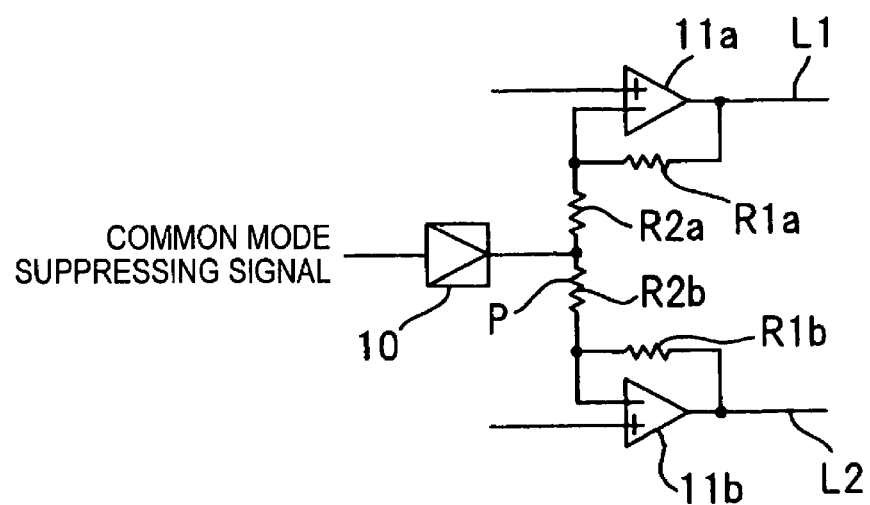
FIG. 8 is a diagram showing an example of a constitution for superposing a suppression signal on a transmission signal (or transmission lines) in analog.

FIG. 8 is a diagram showing an example of a constitution of superposing the suppression signal on the transmission signal (or transmission line) in analog.

In FIG. 8, a suppression signal is applied to a common connecting point (common connecting point of resistors R2a, R2b) of two pieces of differential amplifiers (11, R1a, R2a and 11b, R1b, R2b) provided in correspondence with respectives of the pair of transmission lines (L1, L2) for amplifying the transmission signals. Thereby, the suppression signal can be superposed on the transmission signal.

Figure 9:
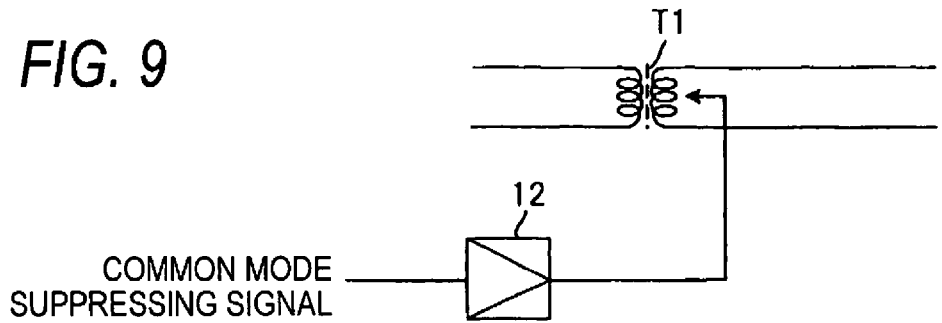
FIG. 9 is a diagram showing other example of a constitution for superposing a suppression signal on a transmission signal (or transmission lines) in analog.

FIG. 9 is a diagram showing other example of a constitution of superposing the suppression signal on the transmission signal (or transmission line) in analog. In FIG. 9, when the transmission signal is transmitted to the transmission lines (L1, L2) by way of a coupler transformer (T1), the suppression signal is applied on a tap (center tap) provided at a center position of an output side winding of the coupler transformer (T1). Thereby, the suppression signal can be superposed on the transmission signal.

Figure 10:
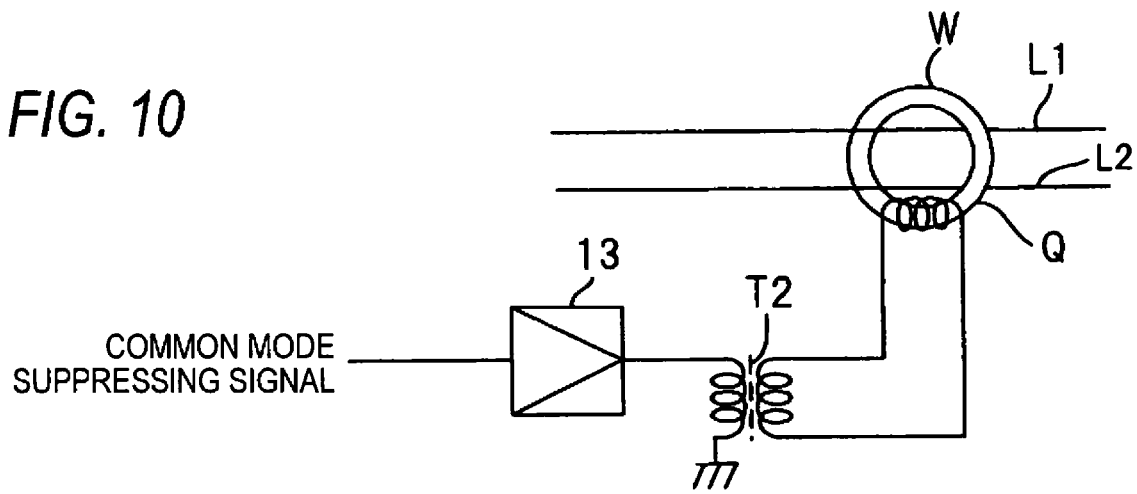
FIG. 10 is a diagram showing other example of a constitution for superposing a suppression signal on a transmission signal (or transmission lines) in analog.

FIG. 10 is a diagram showing other example of a constitution for superposing the suppression signal on the transmission signal (or transmission lines) in analog. In FIG. 10, a magnetic core (W) in a ring-like shape is provided, a winding (Q) is provided at the magnetic core (W) in the ring-like shape, and the suppression signal is applied on the transmission lines (L1, L2) by magnetic coupling.

That is, the suppression signal is amplified by the amplifier 12, the winding (Q) provided at the magnetic core (W) is driven by way of a transformer (T2) and the suppression signal is injected to the transmission lines (L1, L2) by magnetic coupling.

Figure 12:
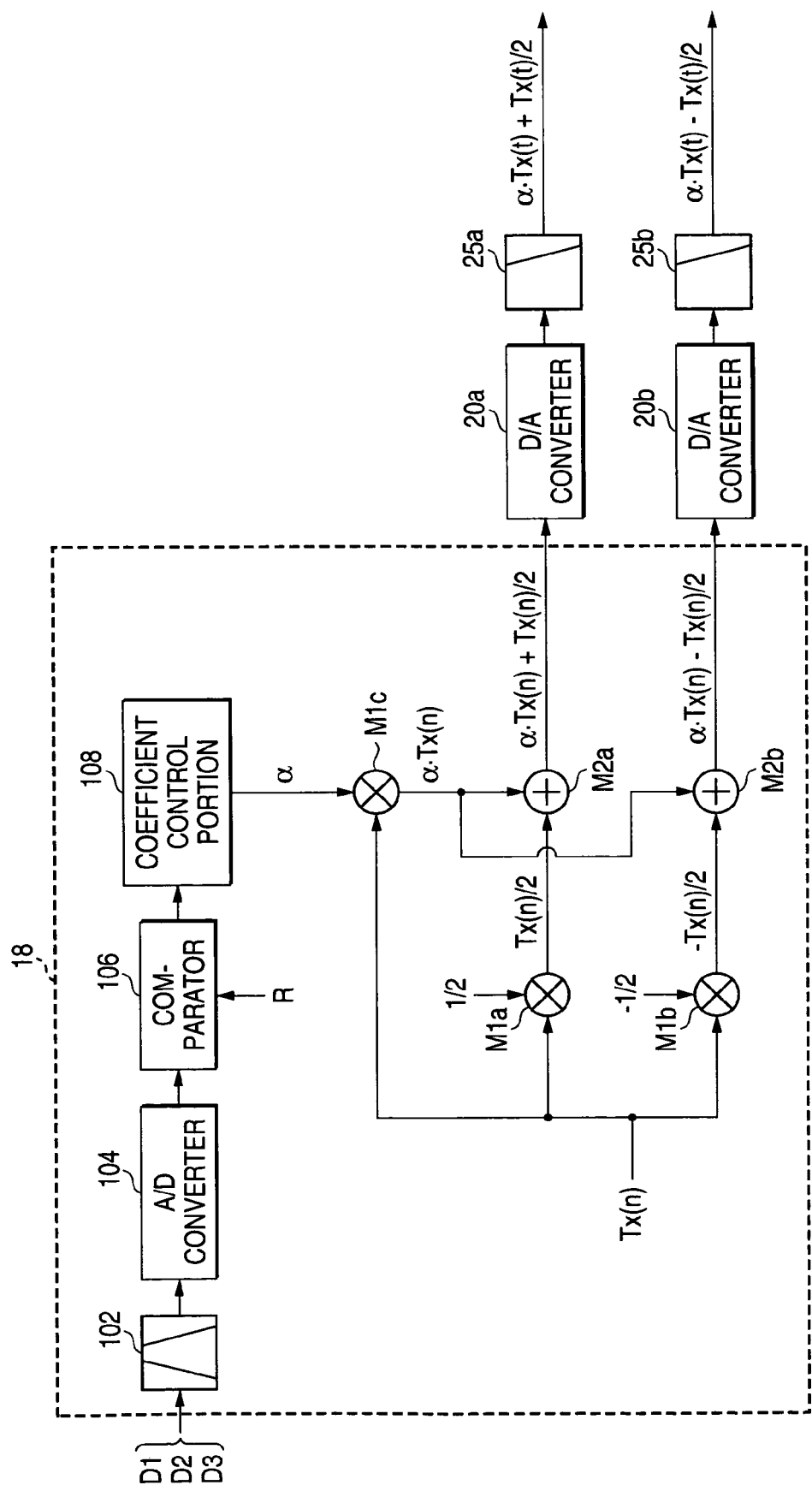
FIG. 12 is a block diagram showing an example of constitution of a balanced transmission signal when a suppression signal is realized to generate and superpose by using a digital signal processing.
Figure 22:
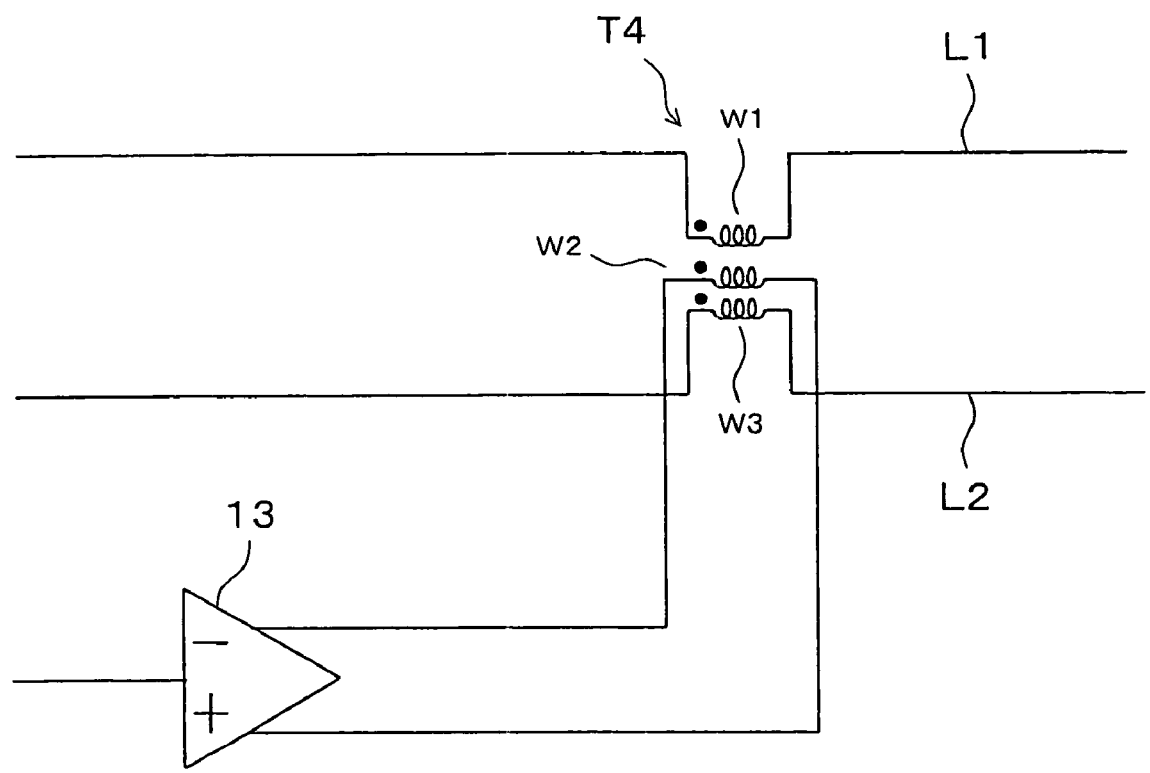
FIG. 22 shows the transformer of FIG. 12 in detail, and is a diagram showing other example of a constitution of superposing a suppression signal on a transmission signal (or transmission lines) in analog, with the magnetic core (W) shown in FIG. 12 omitted.

FIG. 22 shows the transformer of FIG. 12 in details, and is a diagram showing other example of a constitution of superposing a suppression signal on a transmission signal (or transmission lines) in analog. Further, in FIG. 22, the magnetic core (W) shown in FIG. 12 is omitted.

As shown by FIG. 22, a transformer T4 provided with three windings around the same magnetic core is provided, two windings (W1, W3) thereof are respectively inserted to the transmission lines in series therewith, the remaining winding (W2) is used as a superposing winding, and the suppression signal is applied on the transmission lines by magnetic coupling. That is, the suppression signal is amplified by the differential output amplifier 13 to drive the winding (W3) and the suppression signal is injected to the transmission lines (L1, L2) by magnetic coupling.

Figure 11:
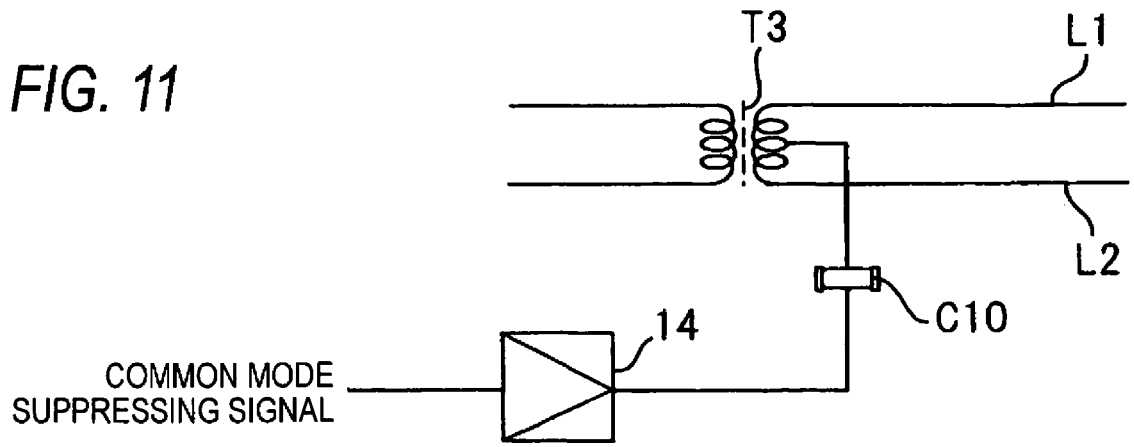
FIG. 11 is a diagram showing other example of a constitution for superposing a suppression signal on a transmission signal (or transmission lines) in analog.

FIG. 11 is a diagram showing other example of a constitution for superposing a suppression signal on a transmission signal (transmission lines) in analog. In FIG. 11, a coupling capacitor C10 is added to the constitution of FIG. 9 and the suppression signal is applied to the transmission lines (L1, L2) by utilizing electrostatic coupling.

In this way, the unbalance of the transmission lines can effectively be reduced by superposing the suppression signal having a characteristic of suppressing the unbalance of he parallel lines on the transmission signal (or transmission lines) by using various kinds of adders.

Next, an explanation will be given of a constitution of an apparatus when the suppression signal is realized to generate and superpose by using a digital signal processing in reference to respective second through fourth embodiments.

Second Embodiment

FIG. 12 is an outline constitution diagram showing a portion of an inner constitution of a balanced transmitting apparatus according to a second embodiment, showing an example of a constitution of a balanced transmitting apparatus when a suppression signal is realized to generate and superpose by using a digital signal processing.

As shown by FIG. 12, the transmission data generating portion 18 (shown by being surrounded by a dotted line in the drawing) is provided with the band pass filter 102 for removing unnecessary signals out of band included in the unbalance detecting signals DI through D3, the A/D converter 104, the comparator 106 for comparing the level of the unbalance detecting signal with the reference value (R) and outputting the result of the comparison, the coefficient control portion 108 for generating the correction coefficient a) based on the signal showing the result of comparison by the comparator 106, the multiplier M1c for generating the suppression signal by multiplying the original transmission signal Tx (n) by the correction coefficient $\alpha$, the pair of multipliers M1a, M1b for forming the balanced transmission signals, and the pair of adders M2a, M2b for adding the suppression signal to the balanced transmission signals. Further, the coefficient control portion 108 and the multiplier M1c are provided with the function of the suppression signal generator.

The original transmission signals Tx (n) are applied with coefficients (that is, ½, –½) by the multipliers M1a, M1b and are converted into Tx (n)/2, –Tx(n)/2. The values become the balanced transmission signals (digital signals).

Next, the suppression signal (that is, Tx (n)·$\alpha$) is superposed on the balanced transmission signals by the adders M2a, M2b to provide $\alpha$·Tx (n)+Tx (n)/2, $\alpha$·Tx (n)–Tx (n)/2. These are the balanced transmission signals after a suppressing processing.

By pertinently selecting an absolute value and a sign (positive or negative) of the parameter a, an amplitude and a phase (current direction) of the suppression signal can be controlled. That is, the gain and the phase of the suppression signal for suppressing the common mode current can respectively be controlled independently from each other by the parameter a.

The coefficient control circuit 108 of FIG. 12 pertinently selects and outputs the parameter a to provide the suppression signal for canceling a component of the common mode signal produced by the unbalance circuit component of communication lines (PL1, PL2).

Figure 13:
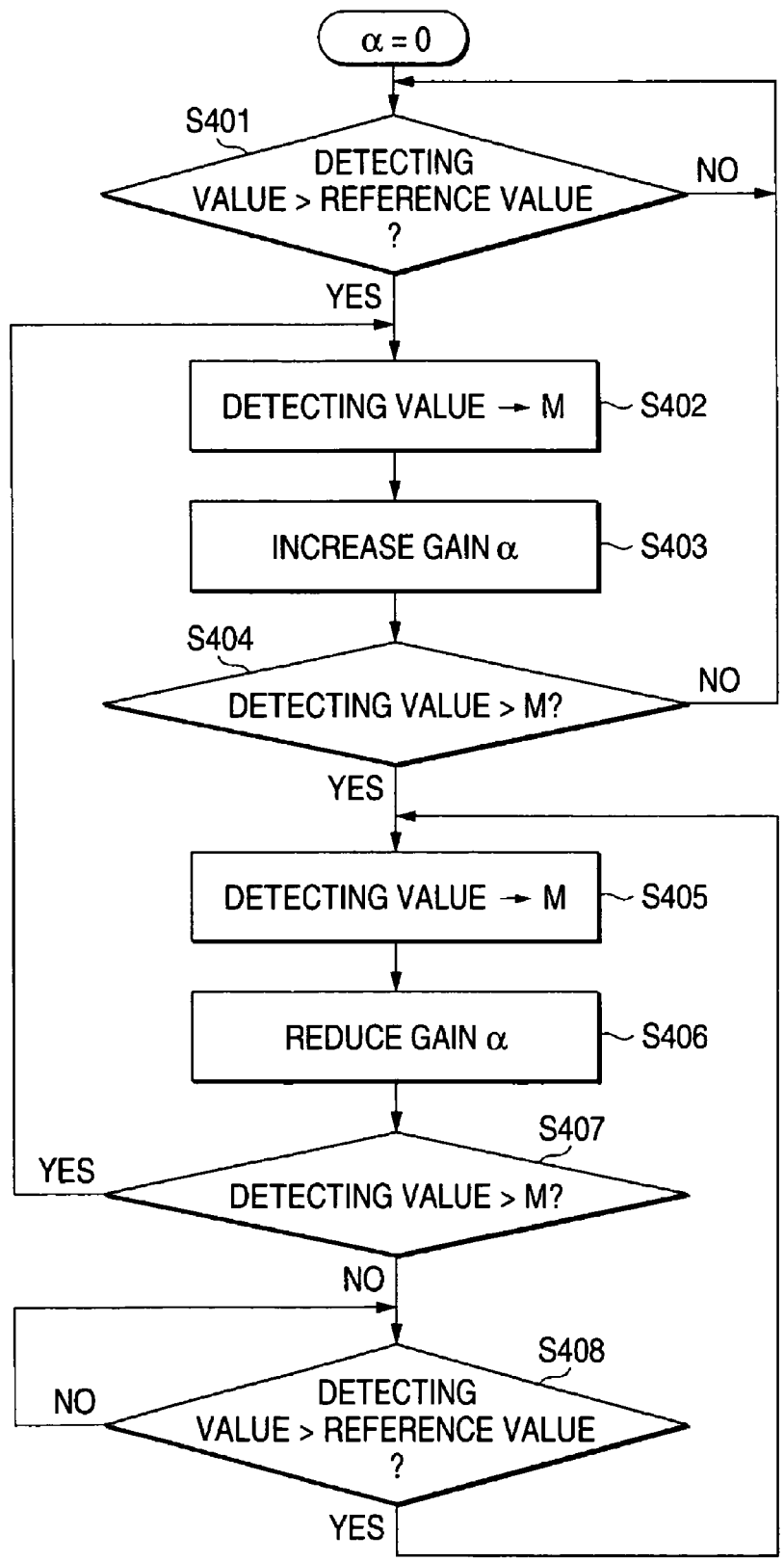
FIG. 13 is a flowchart showing a method of generating a coefficient according to a second embodiment of the invention.

FIG. 13 is a flowchart showing a method of generating the coefficient according to the second embodiment of the invention. As shown by FIG. 13, first, as an initial state, the parameter (gain) $\alpha$ is set to 0. Further, a detected value of the unbalance detecting signal and a reference value are compared (S401). When the detected value is equal to or smaller than the reference value, a processing of S401 is repeated.

When the unbalance detecting value is larger than the reference value, the unbalance detecting value in this case is set to M (S402) and the gain a is increased (S403). Thereafter, the detected unbalance detecting value and M are compared (S404) and when the unbalance detecting value is equal to or smaller than M, the operation returns to S401.

When the unbalance detecting value is larger than M, the unbalance detecting value at this occasion is updated by M, that is, a value of M is updated (S405), and the gain a is reduced (S406). Thereafter, the detected unbalance detecting value and M are compared (S407) and when the unbalance detecting value is larger than M, the operation returns to S402.

When the unbalance detecting value is equal to or smaller than M, the unbalance detecting value and the reference value are compared (S408), when the unbalance detecting value is larger than the reference value, the operation returns to S405 and when the unbalance detecting value is equal to or smaller than the reference value, a processing of S408 is repeated.

Therefore, only when the unbalance detecting value is larger than the reference value, that is, only when the unbalance state exceeds an allowable range, the control of the parameter a is carried out. Further, it is preferable to set the reference value to a value sufficiently lower than a minimum value anticipated to effect an influence on a surrounding of the transmission lines.

Figure 14:
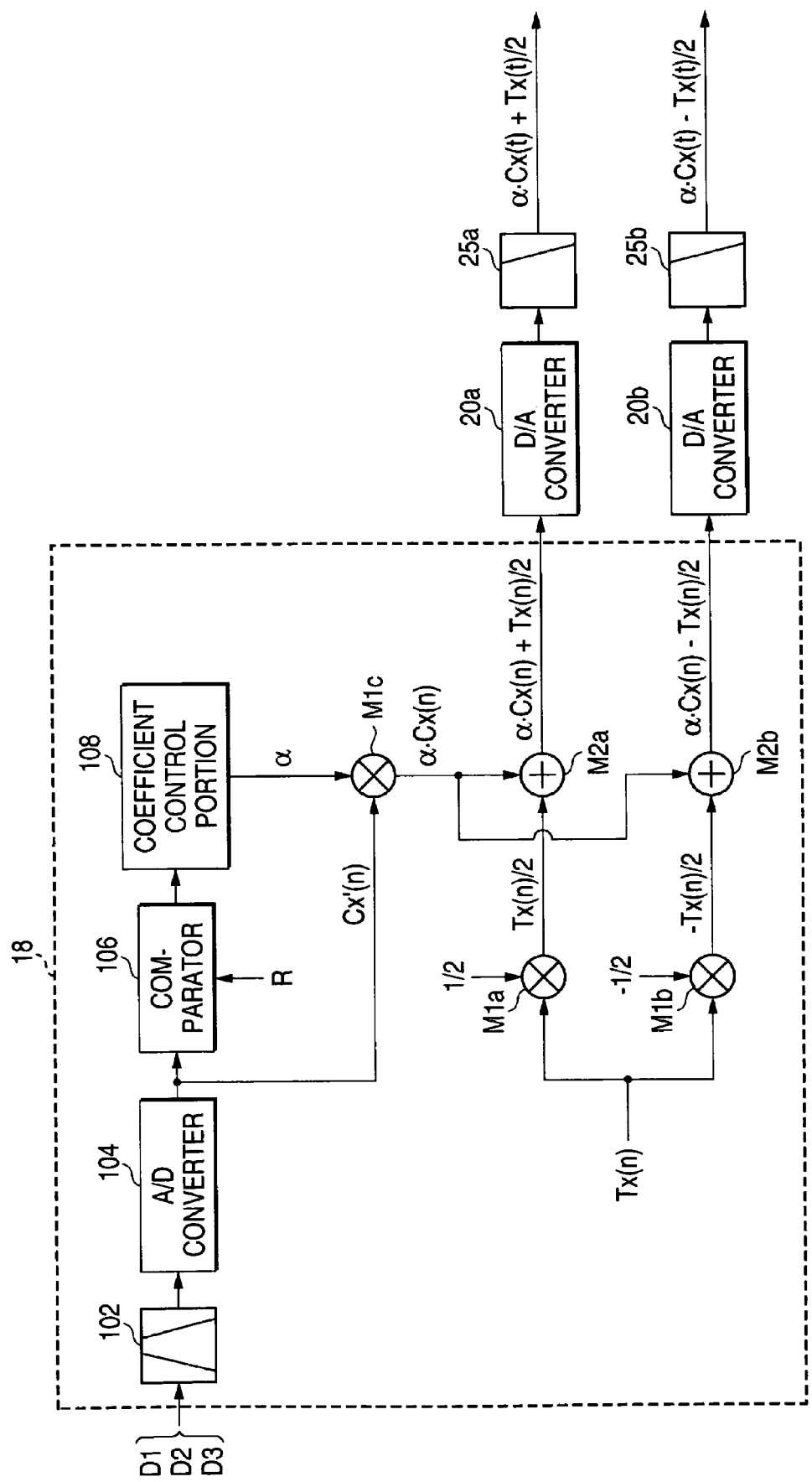
FIG. 14 is a block diagram showing other example of a constitution of a balanced transmitting system when a suppression signal is realized to generate and superpose by using a digital signal processing.

FIG. 14 is a block diagram showing a second example of a specific constitution of the transmission data generating portion of the second embodiment. Portions similar to those of the balanced transmitting apparatus of FIG. 12 are attached with the same notations.

As shown by FIG. 14, the multiplier M1c multiplies a signal Cx (n) constituted by converting the detecting signal (at least one of D1 through D3) which is an output of the D/A converter 104 into a discrete data by the correction coefficient a.

Further, the original balanced signal and an output of the multiplier M1c are added by the adders M2a, M2b, and a result of addition are converted into analog by D/A converters 20a, 20b, to provide transmission signals {α·Cx (t)+(Tx (t)/2)}, and {α·Cx (t)−(Tx (t)/2)} by way of low pass filters 25a, 25b.

According to the balanced transmitting apparatus of the second embodiment, by selecting the parameter a in accordance with the level of the unbalance detecting signal, generating the coefficient including the parameter a and superposing (adding) the coefficient to respectives of the balanced transmission signal, the balanced transmission signals provided with a characteristic of suppressing the unbalance component of the communication lines can be generated in real time. Further, since the digital technology is used, a high speed and accurate unbalance suppressing control is realized.

Further, when a difference of the transmission signals superposed with the suppression signal (α·Tx (n)+Tx (n)/2, α·Tx (n)−Tx (n)/2) is calculated, the difference becomes Tx (n). This signifies that a differential mode (normal mode) signal provided from the balanced transmission signals is equal to the original transmission signal Tx (n).

That is, a normal mode signal remains unchanged even when superposed with the suppression signal. Therefore, a hazard is not brought about in communication. Further, when Tx (n) is nullified, operation of suppressing the degree of line balance can be carried out not only in transmitting but also in receiving or standby.

Respective of the balanced transmission signals superposed with the suppression signal are converted into analog signals by the D/A converters 20a, 20b, removed of high harmonics components by the low pass filters 25a, 25b and transmitted to the transmission lines.

Third Embodiment

Figure 15:
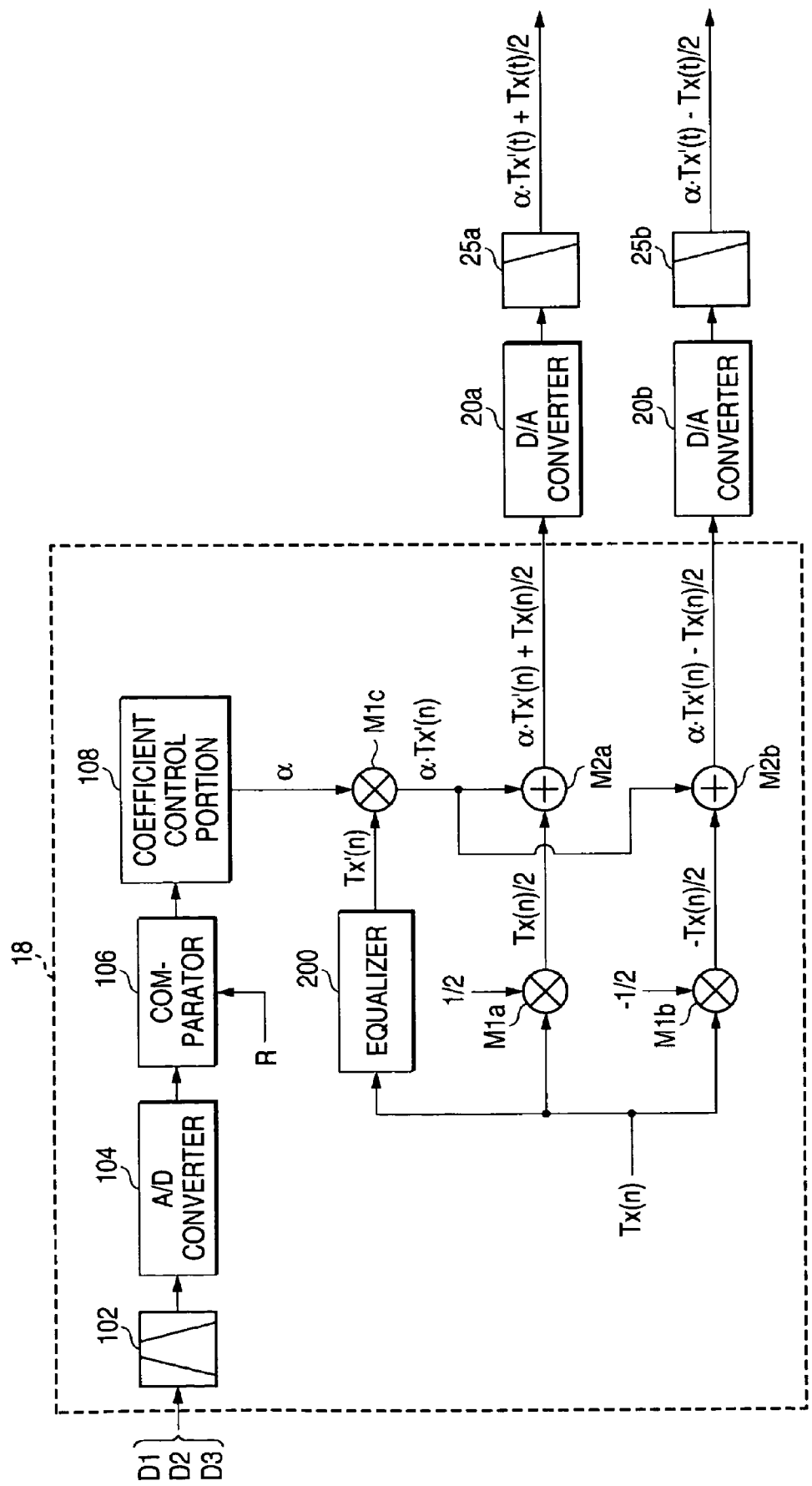
FIG. 15 is a block diagram showing other example of a constitution of a balanced transmitting system when a suppression signal is realized to generate and superpose by using a digital signal processing.

FIG. 15 is an outline constitution diagram showing a portion of an inner constitution of a balanced transmitting apparatus according to a third embodiment, showing other example of a constitution of a balanced transmitting apparatus when a suppression signal is realized to generate and superpose by using a digital signal processing. According to the third embodiment, a suppression signal is provided with a characteristic of suppressing a characteristic of a frequency characteristic or the like of a system including at least one of communication lines, an unbalance detector, and a transmission data generating portion.

Further, constituent elements similar to those of the second embodiment are attached with the same notations. The balanced transmitting apparatus of the embodiment is provided with an equalizer 200 having a characteristic inverse to a frequency characteristic of a system including communication lines, an unbalance detector, a transmission data generating portion or the like. Further, the coefficient control portion 108, the equalizer 200 and the multiplier M1c are provided with a function of a suppression signal detector.

Generally, an impedance of communication line is provided with a frequency characteristic (frequency dependency) since the impedance is constituted by a complex number accompanied by a reactance component. Further, there is also a case in which a detecting sensitivity of an unbalance detector (sensor, detecting circuit) is provided with a frequency dependency.

In the case of former, a response of a line to a control signal for suppressing an unbalance component differs by a frequency and therefore, the frequency needs to be corrected. Further, in the case of the latter, a correction for correctly detecting an unbalance state is needed.

Hence, according to the embodiment, a suppression signal is generated to suppress also a frequency characteristic of a system including communication lines, an unbalance detector, a data generating portion or the like.

Here, the equalizer 200 is constituted by including an amplitude r equalizer, a phase equalizer or a combination of these. As the amplitude equalizer, there is pointed out a constitution including a filter, a constitution including a plurality of band pass filters, an amplitude control portion (multiplier, LUT (look up table) or the like) for controlling an amplitude of an output of the band pass filter and an adder for adding respective signals amplitudes of which are controlled, a constitution of executing a processing on a frequency axis by using a discrete Fourier converter and an inverse discrete Fourier converter or the like. Further, as the phase equalizer, a constitution including all pass filter, a constitution including a delaying apparatus or the like is pointed out.

Here, an amplitude characteristic and a phase characteristic of a line response to a control signal are respective designated by $H1(\omega)$ and $\theta1(\omega)$. Further, an amplitude characteristic and a phase characteristic of an unbalance detector are respectively designated by $H2(\omega)$ and $\theta2(\omega)$.

The equalizer 200 is provided with characteristics inverse to response functions of the amplitude and the phase of the unbalance detecting signal, $H1(\omega) \times H2(\omega)$, $\theta1(\omega)+\theta2(\omega)$. That is, the equalizer 200 is provided with characteristics of $1/(H1(\omega) \times H2(\omega))$, $-(\theta1(\omega)+\theta2(\omega))$. That is, first, the original transmission signal Tx (n) is corrected by using the equalizer 200 to provide Tx' (n).

Next, Tx' (n) is multiplied by the correction coefficient a outputted from the coefficient control means 108 by the multiplier M1c to generate the suppression signal α·Tx' (n).

Further, the suppression signal α·Tx' (n) is added to the balanced transmission signals (Tx (n)/2, −Tx (n)/2) by the adders M2a, M2b. Thereby, there are provided the balanced transmission signals (α·Tx' (n)+Tx (n)/2, α·Tx' (n)−Tx (n)

having characteristics of canceling also the frequency characteristic of the system including the communication line and the sensor.

That is, Tx' (t) designates the original transmission signal provided with the characteristic inverse to the frequency characteristic of the communication line and the unbalance detector and therefore, the suppression signal α·Tx' (n) is provided with the frequency characteristic for canceling the frequency characteristic of the communication line and the unbalance detector.

Thereafter, similar to the second embodiment, by pertinently selecting the absolute value and the sign (positive or negative) of the parameter a, the amplitude and the phase (current direction) of the suppression signal for suppressing the unbalance can be controlled. That is, the gain and the phase of each suppression signal can respectively controlled independently from each other by the parameter α.

The balanced transmission signals are converted into analog signals by the D/A converters 20a, 20b, removed of the high harmonics components by the low pass filters 20a, 20b and transmitted to the transmission lines.

Also in the embodiment, the differential (normal) mode signal becomes Tx(t) and a hazard is not brought about in transmission at all.

Further, in the constitution of FIG. 14, when the equalizers 200 are inserted into the A/D converter 104 and the multiplier M1c, by changing the unbalance detecting signal, the characteristics of the transmission lines, the unbalance detector, the transmission data generating portion or the like can be corrected.

According to the balanced transmitting apparatus of the third embodiment, also the frequency characteristic provided to the communication lines or the unbalance detector can be suppressed and therefore, in a wide frequency band, a control of suppressing the common mode signal can be realized highly accurately.

Further, although not illustrated, by interposing the equalizer between the A/D converter 102 and the comparator 106 of FIG. 15, a shift of a level between a level of the unbalance detecting signal and an actual interference level can also be suppressed.

That is, in reality, there is also conceivable a case in which the level of the unbalance detecting signal and the actual interference level are not proportional and some shift is produced therebetween.

In that case, there can be brought about also a case in which the balanced transmission signal is generated based on the unbalance detecting signal and even when the unbalance detecting signal becomes a sufficiently low value, the actual interference is not sufficiently reduced.

In that case, it is effective to previously measure the shift between the level of the unbalance detecting signal and the actual interference level and correct the unbalance detecting signal to resolve the shift.

Hence, the equalizer having the characteristic of suppressing the shift between the level of the unbalance detecting signal and the actual interference level is provided between the A/D converter 102 and the comparator 106 of FIG. 15 and the operation of generating the parameter a is carried out based on the corrected unbalance detecting signal.

By the constitution, the real interference level can be suppressed to be low and the expected effect of reducing the interference is always achieved.

Further, although according to the embodiment, an explanation has been given of suppressing the frequency characteristic of the communication lines or the unbalance detector, a similar correction can be carried out also with regard to a characteristic of other portion constituting the control system. That is, a distortion generated in the control system and other nonlinear distortion can also be removed.

Further, although according to the embodiment, the constitution of changing the correction coefficient by the output of the equalizer is shown, in place of changing the correction coefficient, there may be provided means for correcting the characteristic of the communication lines, the unbalance detector or the like, for example, after multiplying the original balanced signal by the correction coefficient or after converting the transmission data to analog without changing the correction coefficient.

Fourth Embodiment

Figure 16:
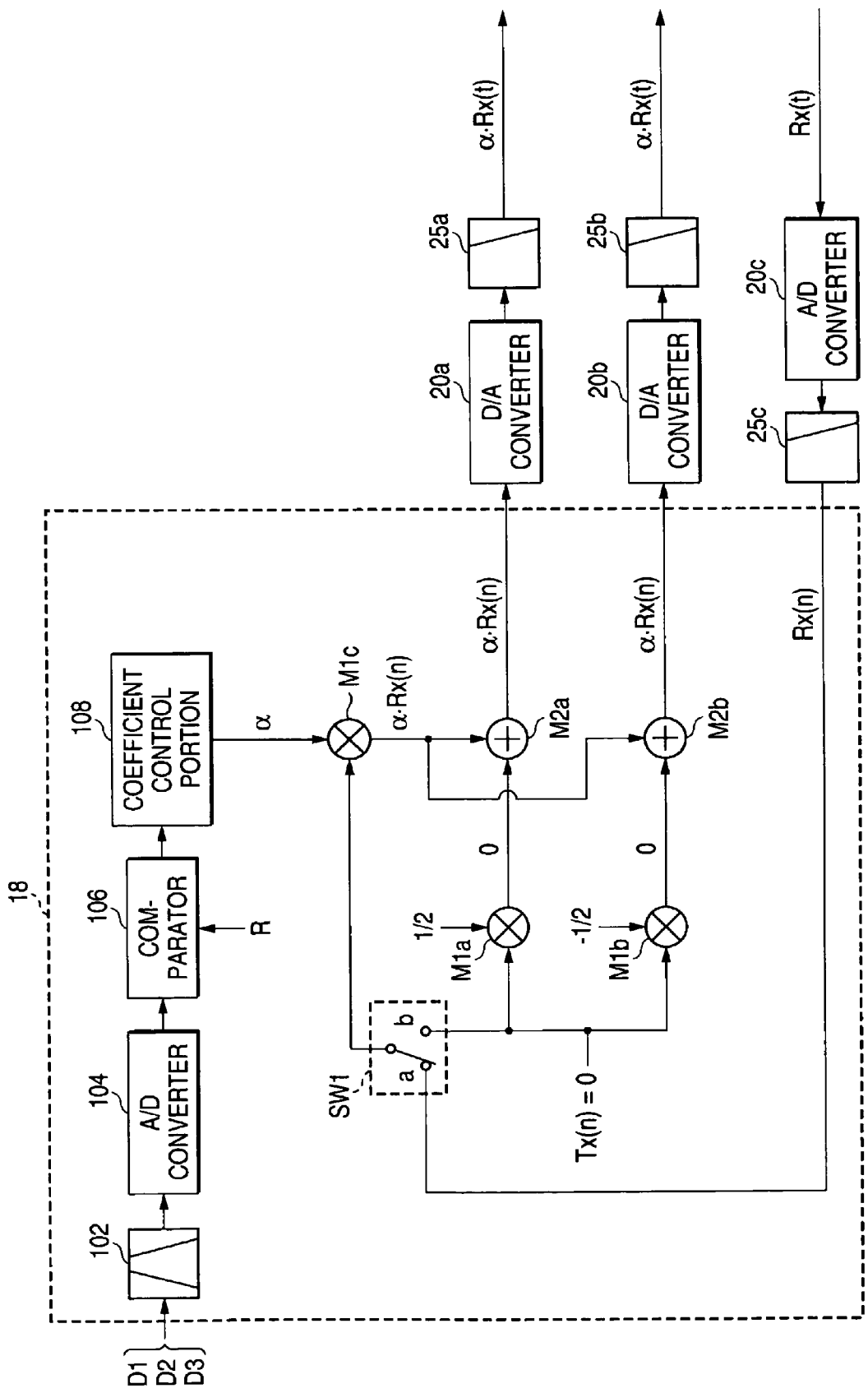
FIG. 16 is a block diagram showing other example of a constitution of a balanced transmitting system when a suppression signal is realized to generate and superpose by using a digital signal processing.

FIG. 16 is an outline constitution diagram showing a portion of an inner constitution of a balanced transmitting apparatus according to a fourth embodiment, showing other example of a constitution of a balanced transmitting apparatus when a suppression signal is realized to generate and superpose by using a digital signal processing.

Further, constituent elements similar to those of the first embodiment are attached with the same notations. The balanced transmitting apparatus of the embodiment is provided with an A/D converter 20c for converting an analog signal (Rx (t)) received by way of a switch SW1 and a communication line and a low pass filter 400.

According to the above-described embodiments, the balanced transmission signal is provided with the characteristic of suppressing the unbalance component of the communication lines by superposing the suppression signal to the balanced transmission signal in transmission.

According to the embodiment, there is adopted a constitution of generating the suppression signal for suppressing the unbalance component (common mode current or the like) of the communication lines to output to the communication lines even in a nontransmission mode, that is, a receiving mode or a standby mode. At this occasion, an analog signal (Rx (t)) received via the communication lines is utilized as a signal source for generating the suppression signal.

Thereby, the unbalance component of the communication lines is always suppressed even when the transmitting apparatus is brought into a state other than the transmitting mode. That is, the interference is always reduced.

In the transmission mode, the switch SW1 is switched to a side of a b terminal. In this case, the balanced transmission signal having the characteristic of suppressing the unbalance component of the communication lines is generated by operation as explained in the second embodiment (FIG. 12).

On the other hand, the switch SW1 is switched to a side of a terminal in the receiving mode or the standby mode. Thereby, the multiplier M1c is applied with a receiving signal Rx (n) formed into a digital signal by way of the low pass filter 400 in place of the original transmission signal Tx (n).

That is, the multiplier M1c is inputted with Rx (n) provided by converting the analog signal Rx (t) received by way of the communication lines into the digital signal by the A/D converter 20c via the switch SW1.

Further, by multiplying the receiving signal Rx (n) by the coefficient α, a suppression signal (α·Rx (n)) for suppressing the common mode signal is generated.

The suppression signal (α·Rx (n)) is added to the balanced transmission signal Tx (n) (Tx (n)=0 owing to the nontransmission mode). As a result, the retraining signal (α·Rx (n)) is outputted as it is.

The suppression signal is converted into a digital signal by the A/D converters 20a, 20b (the converted signal becomes (α·Rx (t)) is outputted to the communication lines via the low pass filters 25a, 25b.

In this way, according to embodiment, the suppression signal for suppressing unbalance component (common mode current or the like) of the communication lines is generated and transmitted to the communication lines even in the receiving mode or the standby mode.

Therefore, the unbalance component of the communication lines is always suppressed even when the transmitting apparatus is brought into the state other than the transmitting mode.

Further, although not illustrated, an equalizer having a function similar to that of the equalizer 200 explained in the second embodiment may be provided on an output side of the low pass filter 400.

According to the balanced transmitting apparatus of the fourth embodiment, even in a system in which the unbalance circuit component is present in the transmission lines, radiation from the lines is reduced, and also the transmission lines can be used for use of high speed communication.

Fifth Embodiment

Figure 17:
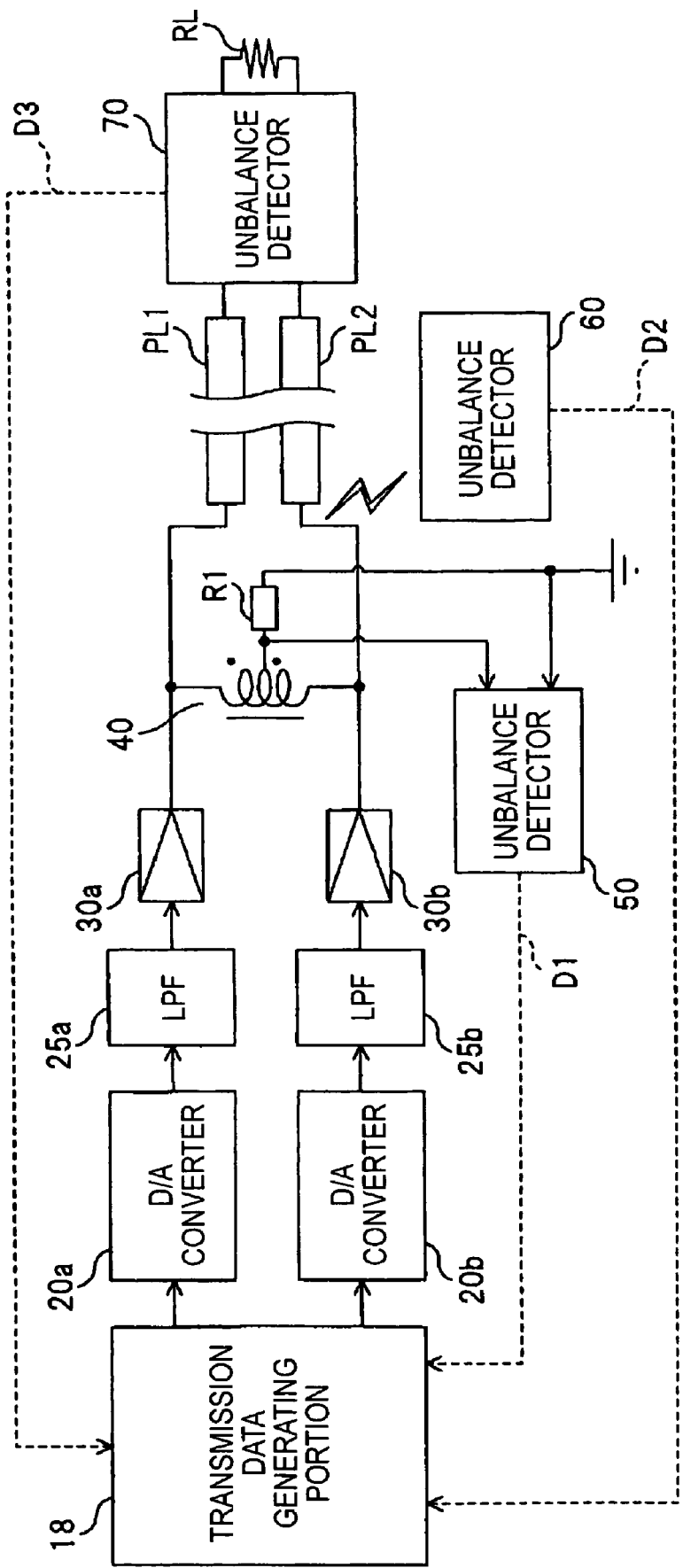
FIG. 17 is a diagram showing an outline constitution of a communication system using a balanced transmitting apparatus of the invention and a constitution for detecting an unbalance state of a pair of transmission lines.

FIG. 17 is a diagram showing an outline constitution of a communication system (balanced transmission system) using a balanced transmitting apparatus of the embodiment of the invention and an example of constitution for detecting an unbalance state of a pair of transmission lines.

As shown by FIG. 17, the balanced transmitting apparatus is provided with a transmission data generating portion 10, D/A converter 20a, 20b, the low pass filters 25a, 25b, output stage amplifiers (driver amplifiers) 30a, 30b and an inductor 40. Further, as communication lines, a pair of transmission lines PL1, PL2 are used. The transmission data generating portion 10 of the embodiment is provided with a function of a transmission signal generator for generating the balanced transmission signal.

As the communication lines, the transmission lines (for example, power lines) PL1, PL2 which are transmission lines comprising a pair of conductors are used.

Next, an explanation will be given of a constitution of means (unbalance detector) for detecting unbalance of the communication lines (including portions of lines reaching the pair of transmission lines PL1, PL2) and an arrangement thereof.

Further, in FIG. 17, a plurality of examples are illustrated with regard to the unbalance detector. Actually, it is not necessary to provide all of the unbalance detectors but any single one thereof may be provided.

Next, an explanation will be given of a constitution of means (unbalance detector) for detecting unbalance of the communication lines (including portions of lines reaching the pair of transmission lines PL1, PL2) and an arrangement thereof FIG. 17 illustrates examples of three kinds of unbalance detectors 50, 60, 70. Actually, it is not necessary to provide all of the unbalance detectors but at least any single one thereof may be provided.

First, the unbalance detector 50 will be explained. The unbalance detector 50 detects the unbalance state by detecting a voltage produced between a middle point tap provided on the output side of the inductor 40 and the ground to output a detecting signal D1 thereof.

Next, the unbalance detector 60 measures an amount of measurement constituting a criterion of an influence on other apparatus or communication of an electric field, a magnetic filed or the like such as a degree of interference with other apparatus or a degree of interference with a radio wave at a predetermined frequency (interference level) or the like, thereby, the unbalance of the communication lines is detected and a detecting signal D2 is outputted. In this case, the unbalance of the communication lines is indirectly measured.

Further, the unbalance detector 70 is provided at the transmitting apparatus on the receiving side and a detecting signal D3 thereof is outputted to the data generating portion 18.

Further, the transmitting data generating portion 18 is provided with a constitution illustrated in, for example, FIG. 12, FIG. 14 through FIG. 16, generates the parameter a based on the unbalance detecting signal (D1 through D3), generates a suppression signal by multiplying the original balanced transmission signal by the correction coefficient a, adds the suppression signal to respective signals of the balanced transmitting signals and generates and outputs the balanced transmission signal having the characteristic of suppressing the unbalance component.

Thereby, it is possible to measure the unbalance state of the communication lines and suppressing the unbalance component of the communication lines in real time based on the detecting signal.

As explained above, according to the embodiment of the invention, the balanced transmitting apparatus having the function of suppressing the unbalance component of the communication lines (transmission lines) can be realized.

Further, the unbalance component of the communication lines can be suppressed in real time by detecting the unbalance state of the transmission lines and dynamically controlling the frequency characteristic of the suppression signal based on the detecting signal.

Further, the suppressing operation of reducing the common mode current can precisely be carried out even in any frequency band by providing the characteristic of also suppressing the frequency characteristic provided to the transmission lines per se or the sensor to the suppression signal.

Further, when there is brought about the shift between the level of the unbalance detecting signal and the actual interference level, by correcting the level of the unbalance detecting signal in consideration of the shift and thereafter generating the suppression signal, the real interference produced owing to radiation from the communication lines can be reduced.

Further, even when the balanced transmitting apparatus is brought into the receiving mode or the standby mode, by continuing to transmit the suppression signal at a low level, the unbalance of the transmission lines is always suppressed and radiation from the communication lines can effectively be suppressed.

Further, even when the balanced transmitting apparatus is brought into the receiving mode or the standby mode, by generating and outputting the suppression signal based on the signal received by way of the transmission lines, the unbalance of the transmission lines is always suppressed and radiation from the communication lines is effectively suppressed.

Further, the suppression signal can efficiently be generated since the receiving signal is utilized.

Further, the suppression signal can be generated efficiently by generating the suppression signal based on the unbalance detecting signal per se.

Further, the suppression signal can be generated efficiently by generating the suppression signal based on the transmitting signal.

Further, the suppression signal can be generated efficiently be generating the suppression signal by utilizing the voltage induced in the auxiliary winding of the coupler transformer.

Further, the suppression signal can be generated by effectively utilizing an existing facility by utilizing the dividing resistor used for generating the suppression signal also as the receiving load.

Further, the effect of effectively suppressing the unbalance of the communication lines can be promoted by using the coupler transformer inserted with the common mode choke coil.

Further, the suppression signal can be superposed by the analog signal processing by adopting the system superposing the suppression signal on the common connecting point of the two differential amplifiers for amplifying the balanced transmission signals.

Further, the suppression signal can be superposed by the analog signal processing by adopting the system of superposing the suppression signal on the center tap of the coupler transformer.

Further, the suppression signal can be superposed by the analog signal processing by adopting the system of superposing the suppression signal on the transmission lines by utilizing the magnetic coupling or the electrostatic coupling.

Further, the high speed and highly accurate unbalance suppressing processing can be realized by realizing to generate the suppression signal and superpose the suppression signal on the transmitting signal at the stage before A/D conversion.

Further, the highly accurate suppression signal can be generated in real time by generating the correction coefficient based on the unbalance detecting signal and generating the suppression signal by multiplying the original transmission signal by the correction coefficient.

Further, by carrying out the digital signal processing utilizing the equalizer, the suppression signal can be provided with the characteristic of suppressing the frequency characteristic of the system including the transmission lines and the sensor for detecting the unbalance state, thereby, the common mode signal can be reduced in any frequency band.

Further, even in the nontransmission mode, by utilizing the receiving signal, generating the suppression signal by the digital signal processing and outputting the suppression signal to the communication lines, always, the unbalance of the communication lines can be suppressed, further, since the receiving signal is utilized, the efficient processing can be carried out, further, since the digital signal processing is utilized, the high speed and highly accurate unbalance suppressing processing can be carried out.

Further, as data communication, the invention is preferably used in electric lamp line communication using a frequency division multiplex signal or OFDM (Orthogonal Frequency Division Multiplex) or data communication of wireless LAN, ADSL or the like.

Further, the balanced transmission apparatus of the embodiment of the invention may be operated as an electric lamp line communication apparatus by using electric lamp lines as the transmission lines. Particularly, there is frequently a case in which a degree of balance of the electric lamp line is low and therefore, there is a case of producing radiation by the unbalance state of the electric lamp lines. However, the balanced transmitting apparatus of the embodiment of the invention can suppress the unbalance component of the transmission lines and therefore, the radiation from the electric lamp lines can be reduced even when the balanced transmission apparatus of the embodiment of the invention is used in high speed communication utilizing the electric lamp lines provided to respective households (for example, communication using a predetermined frequency band of 2 MHz through 30 MHz band or the like.

Further, in the balanced transmission apparatus of the embodiment of the invention, it is preferable to carry out the processing of generating the suppression signal ($e_c$) in a procedure of elevating the level of the transmission signal little by little. For example, the output is controlled to elevate the level in steps from an output level anticipated not to produce an interference in lines having an imaginable worst characteristic to the predetermined transmission output. Thereby, data transmission can be carried out in a state in which the interference is not produced firmly (state of maintaining the balanced state of the lines).

Thereby, in a stage of establishing connection with a communication apparatus on a counter side, by suppressing the unbalance of the communication lines by elevating the output level little by little, a drawback accompanied by the unbalance suppressing operation can be avoided.

Further, although according to the embodiment of the invention, there is shown the constitution example expressed by electronic elements of circuit blocks or inductors, the embodiment is not limited to the above-described constitution example so far as the embodiment is provided with similar operation or a function but can be realized by various constitutions of combinations of analog circuits, digital circuits and electronic elements. Further, the function of each constituent element may be constructed by a constitution of being realized by either of a hardware processing and a software processing. Further, small-sized formation of the apparatus can be achieved by integrating a portion or a total of the circuits.

Further, in carrying out a correction of suppressing the phase in detecting the unbalance component or controlling the degree of balance of the transmission lines based on the detected unbalance component, a constitution of correcting the shift amount relative to the correction target value as the correction amount may be constructed, contrary thereto, a constitution of executing a correction by constituting the correction amount by the difference between the correction target value and the shift amount may be constructed.

This application is based upon and claims the benefit of priority of Japanese Patent Application No. 2004-121377 filed on Apr. 16, 2004, the contents of which are incorporated herein by reference in its entirety.

The invention achieves the effect of capable of suppressing the unbalance state even when the unbalance component is present in the transmission lines and is useful for the balanced transmission apparatus of the power line communication apparatus or the like.

What is claimed is:

1. A balanced transmitting apparatus for transmitting a transmission signal by using transmission lines comprising a pair of conductors, said balanced transmitting apparatus comprising:

a suppression signal generator that generates, based on a detecting signal of an unbalance state of the transmission lines, a suppression signal for suppressing an unbalance component produced in the transmission lines and executes processing for a receiving signal via the transmission lines;

an adder that adds the suppression signal to each transmission signal transmitting along the pair of conductors;

a correction coefficient generator that generates and outputs a correction coefficient in accordance with the detecting signal of the unbalance state; and a multiplier that multiplies the receiving signal by the correction coefficient to generate the suppression signal.

2. The balanced transmitting apparatus according to claim 1, wherein the detecting signal is provided to detect at least one of a common mode current, a common mode voltage, an electric field, a magnetic field produced at the transmission lines and a degree of interference caused by radiation from the transmission lines.

3. The balanced transmitting apparatus according to claim 1, wherein the suppression signal generator generates the suppression signal based on at least one of a characteristic of the transmission lines, a characteristic of a transmission signal generator, and a characteristic of an unbalance detector for outputting the detecting signal.

4. The balanced transmitting apparatus according to claim 3, wherein the characteristic includes a frequency characteristic.

5. The balanced transmitting apparatus according to claim 3, wherein the suppression signal generator comprises
a characteristic compensator that compensates at least any one characteristic of the characteristic of the transmission lines, the characteristic of the transmission signal generator, and the characteristic of the unbalance detector for outputting the detecting signal for the transmission signal and producing the receiving signal.

6. The balanced transmitting apparatus according to claim 5, wherein the characteristic compensator includes at least either of an amplitude equalizer and a phase equalizer for correcting a frequency characteristic of the characteristic.

7. The balanced transmitting apparatus according to claim 6, wherein the amplitude equalizer or the phase equalizer corrects the characteristic by correcting the transmission signal.

8. The balanced transmitting apparatus according to claim 6, wherein the amplitude equalizer or the phase equalizer corrects the characteristic by correcting the detecting signal.

9. The balanced transmitting apparatus according to claim 1, wherein the suppression signal generator corrects a difference between a detection level of the detecting signal and a level of interference caused by radiation from the transmission lines for the inputted detecting signal in accordance therewith and generates the suppression signal based on the corrected detecting signal.

10. The balanced transmitting apparatus according to claim 1, wherein the suppression signal is generated in a procedure of elevating a level of the transmission signal.

11. The balanced transmitting apparatus according to claim 10, wherein the level of the transmission signal is elevated in steps.

12. The balanced transmitting apparatus according to claim 1, wherein the suppression signal generator generates the suppression signal by applying a predetermined signal processing to the detecting signal for detecting the unbalance state of the transmission lines.

13. The balanced transmitting apparatus according to claim 1, wherein the suppression signal generator generates the suppression signal by applying a predetermined signal processing to the transmission signal transmitting along the transmission lines.

14. The balanced transmitting apparatus according to claim 1, further comprising:
a transformer that transmits the transmission signal to the transmission lines, wherein
the adder applies the suppression signal to a tap provided substantially at a center position of a winding constituting the transformer.

15. The balanced transmission apparatus according to claim 1, wherein the adder applies the suppression signal to the transmission lines by magnetic coupling.

16. The balanced transmission apparatus according to claim 1, wherein the adder applies the suppression signal to the transmission lines by electrostatic coupling.

17. The balanced transmitting apparatus according to claim 1, wherein a power line is used as the transmission line.

18. The balanced transmitting apparatus according to claim 1, further comprising:
an inductor that induces a. predetermined voltage between the pair of conductors and that has a connecting portion connecting to a constant voltage, the connecting portion dividing the predetermined voltage into a first voltage and a second voltage, wherein
the suppression signal generator receives both the first voltage and the second voltage as the detecting signal.

19. The balanced transmitting apparatus according to claim 18, further comprising:
a transformer that: (1) has a core, a primary winding and a secondary winding, the primary winding and the secondary winding being wound around the core, and (2) transmits the transmission signal, wherein
the inductor is wound around the core.

20. The balanced transmitting apparatus according to claim 18, wherein the inductor has a first end and a second end, the first end is connected to one of the pair of conductors, the second end is connected to the other of the pair of conductors.

21. A balanced transmitting apparatus for transmitting a transmission signal by using transmission lines comprising a pair of conductors, said balanced transmitting apparatus comprising:
a suppression signal generator that generates, based on a detecting signal of an unbalance state of the transmission lines, a suppression signal for suppressing an unbalance component produced in the transmission lines;
an adder that adds the suppression signal to each transmission signal transmitting along the pair of conductors; and
a transformer that transmits the transmission signal to the transmission lines,
wherein the suppression signal generator includes a voltage dividing resistor, having a voltage dividing ratio that is controlled based on the detecting signal, and generates the suppression signal based on the voltage dividing ratio.

22. The balanced transmitting apparatus according to claim 21 wherein the voltage dividing resistor is utilized also as a receiving load.

23. The balanced transmitting apparatus according to claim 21, wherein the transformer is inserted with a common mode choke coil.

24. A balanced transmission system comprising:
a transmitting apparatus including a balanced transmitting apparatus comprising:
a suppression signal generator that generates, based on a detecting signal of an unbalance state of transmission lines, a suppression signal for suppressing an unbalance component produced in the transmission lines; and
an adder that adds the suppression signal to each transmission signal transmitting along the transmission lines, and
a receiving apparatus for communicating with the transmitting apparatus via the transmission lines, wherein:
when the balanced transmitting apparatus is in a nontransmission mode, the suppression signal generator executes a processing for a receiving signal received via the transmission lines to generate an unbalance suppression signal and transmits the unbalance suppression signal to the transmission lines, and a level of the unbalance suppression signal is lower than a level of the suppression signal.

25. A balanced transmitting method for transmitting a transmission signal using a pair of transmission lines, said balanced transmitting method comprising:

generating, based on a detecting signal of an unbalance state of the transmission lines, a suppression signal for suppressing an unbalance component produced in the transmission lines;

adding the suppression signal to each transmission signal transmitting along the transmission lines; and when in a nontransmission mode, executing a processing for a receiving signal received via the transmission lines to generate an unbalance suppression signal and transmitting the unbalance suppression signal to the transmission lines, wherein a level of the unbalance suppression signal is lower than a level of the suppression signal.

26. A balanced transmitting apparatus for transmitting a transmission signal by using transmission lines comprising a pair of conductors, said balanced transmitting apparatus comprising:

an unbalance detector that detects existence of a first common mode current in the transmission lines corresponding to the transmission signal transmitted along the transmission lines and that generates a first detecting signal indicating existence of said first common mode current;

a suppression signal generator that generates, based on the first detecting signal by the unbalance detector indicating existence of said first common mode current in the transmission lines, a first suppression signal for suppressing an unbalance component produced in the transmission lines; and an adder that adds the first suppression signal to each transmission signal transmitting along the pair of conductors, wherein:

in case of suppressing a second common mode current in the transmission lines corresponding to a reception signal from the transmission lines, the suppression signal generator executes processing for the reception signal received via the transmission lines to generate a second suppression signal and transmits the second suppression signal to the transmission lines, and a level of the second suppression signal is lower than a level of the first suppression signal.

27. A balanced transmitting method for transmitting a transmission signal by using transmission lines comprising a pair of conductors, said balanced transmitting method comprising:

generating, based on a detecting signal of an unbalance state of the transmission lines, a suppression signal for suppressing an unbalance component produced in the transmission lines;

executing processing for a receiving signal via the transmission lines;

adding the suppression signal to each transmission signal transmitting along the pair of conductors;

generating and outputting a correction coefficient in accordance with the detecting signal of the unbalance state; and multiplying the receiving signal by the correction coefficient to generate the suppression signal.

* * * * *